United States Patent
Miyake et al.

(10) Patent No.: US 9,055,252 B2
(45) Date of Patent: Jun. 9, 2015

(54) IMAGE PROCESSING APPARATUS, IMAGE PROCESSING METHOD, AND PRINTER

(75) Inventors: Nobutaka Miyake, Yokohama (JP); Ryosuke Iguchi, Kawasaki (JP); Tohru Ikeda, Yokohama (JP); Akitoshi Yamada, Yokohama (JP); Mitsuhiro Ono, Tokyo (JP); Fumitaka Goto, Tokyo (JP); Hidetsugu Kagawa, Kawasaki (JP); Tomokazu Ishikawa, Kawasaki (JP); Junichi Nakagawa, Tokyo (JP); Senichi Saito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 407 days.

(21) Appl. No.: 12/966,265

(22) Filed: Dec. 13, 2010

(65) Prior Publication Data
US 2012/0081441 A1  Apr. 5, 2012

(30) Foreign Application Priority Data
Oct. 5, 2010  (JP) ................. 2010-225746

(51) Int. Cl.
H04N 1/401 (2006.01)
G06K 9/03 (2006.01)
H04N 1/60 (2006.01)

(52) U.S. Cl.
CPC .......... *H04N 1/4015* (2013.01); *G06K 9/03* (2013.01); *H04N 1/60* (2013.01); *H04N 1/6038* (2013.01)

(58) Field of Classification Search
CPC .................... H04N 1/60; G06K 9/03
USPC ........................................... 347/15
See application file for complete search history.

(56) References Cited

U.S. PATENT DOCUMENTS 5,495,539 A * 2/1996 Sieverding .............. 382/276
6,025,929 A   2/2000 Nakajima et al.
(Continued)

FOREIGN PATENT DOCUMENTS

JP   10-13674      1/1998
JP   2000-301807  10/2000
(Continued)

OTHER PUBLICATIONS

Handbook of Color Science, second edition, edited by the Color Science Association of Japan, Published by University of Tokyo Press, 1998. (Partial Translation).
(Continued)

*Primary Examiner* — Manish S Shah
*Assistant Examiner* — Jeffrey C Morgan
(74) *Attorney, Agent, or Firm* — Fitzpatrick, Cella, Harper & Scinto

(57) ABSTRACT

Provided is an image processing apparatus that can accurately and efficiently reduce color unevenness that occurs in a color image, which is formed by color mixture of a plurality of different types of inks, due to a variation in ejection characteristic among nozzles. The inks are respectively ejected from the nozzle arrays to print patches; regions where color correction for test color images should be performed are specified; a different types of color correction processing for color signals corresponding to the color correction regions are performed to print color correction patches; a color correction patch to be used is selected; on the basis of selected color correction processing, a table parameter corresponding to a nozzle is formed; when the plurality of color correction patches are formed, only correction candidate values having larger color differences than a predetermined threshold value in a uniform color space are generated for color signals.

17 Claims, 20 Drawing Sheets

(56) References Cited

U.S. PATENT DOCUMENTS

| | | |
|---|---|---|
| 6,450,606 B1 | 9/2002 | Kato et al. |
| 6,467,870 B2 * | 10/2002 | Matsumoto et al. ............ 347/19 |
| 6,474,768 B1 | 11/2002 | Yano et al. |
| 6,494,557 B1 | 12/2002 | Kato et al. |
| 6,814,420 B2 | 11/2004 | Fujita et al. |
| 7,034,844 B2 | 4/2006 | Akiyama et al. |
| 7,069,164 B2 * | 6/2006 | Viturro et al. ................... 702/85 |
| 7,075,679 B2 | 7/2006 | Goto et al. |
| 7,079,152 B2 | 7/2006 | Akiyama et al. |
| 7,145,693 B2 | 12/2006 | Kagawa |
| 7,266,239 B2 | 9/2007 | Akiyama et al. |
| 7,274,491 B2 | 9/2007 | Yamada et al. |
| 7,290,845 B2 * | 11/2007 | Tanaka ............................ 347/15 |
| 7,339,703 B2 | 3/2008 | Kagawa |
| 7,342,684 B2 | 3/2008 | Imafuku et al. |
| 7,411,707 B2 | 8/2008 | Ikeda |
| 7,639,399 B2 | 12/2009 | Ikeda |
| 7,643,178 B2 | 1/2010 | Yamada et al. |
| 7,684,063 B2 | 3/2010 | Fujita et al. |
| 7,750,921 B2 | 7/2010 | Akiyama et al. |
| 7,912,280 B2 | 3/2011 | Miyagi et al. |
| 8,390,889 B2 | 3/2013 | Iguchi |
| 2007/0146752 A1 | 6/2007 | Iguchi |
| 2008/0144060 A1 | 6/2008 | Ishikawa |
| 2008/0239353 A1 | 10/2008 | Hori et al. |
| 2008/0239355 A1 | 10/2008 | Goto et al. |
| 2008/0239410 A1 | 10/2008 | Hashii et al. |
| 2009/0034838 A1 | 2/2009 | Umeda et al. |
| 2011/0038020 A1 | 2/2011 | Kagawa |
| 2012/0081441 A1 | 4/2012 | Miyake et al. |

FOREIGN PATENT DOCUMENTS

| | | |
|---|---|---|
| JP | 2000-301808 A | 10/2000 |
| JP | 2000-301810 A | 10/2000 |
| JP | 2003-134349 A | 5/2003 |
| JP | 2005-219321 A | 8/2005 |
| JP | 2006-179991 A | 7/2006 |
| JP | 2007-181145 A | 7/2007 |
| JP | 2007-318276 A | 12/2007 |
| JP | 2007-320240 A | 12/2007 |
| JP | 2008-187466 A | 8/2008 |
| JP | 2010-76322 A | 4/2010 |
| JP | 2012-080450 A | 4/2012 |

OTHER PUBLICATIONS

U.S. Appl. No. 12/966,823, filed Dec. 13, 2010. Applicants: Akitoshi Yamada, et al.
U.S. Appl. No. 12/966,781, filed Dec. 13, 2010. Applicants: Fumitaka Goto, et al.
U.S. Appl. No. 12/966,799, filed Dec. 13, 2010. Applicants: Tomokazu Ishikawa, et al.
U.S. Appl. No. 12/962,895, filed Dec. 8, 2010. Applicants: Junichi Nakagawa, et al.
U.S. Appl. No. 12/962,889, filed Dec. 8, 2010. Applicants: Hiroyuki Sakai, et al.
U.S. Appl. No. 12/962,875, filed Dec. 8, 2010. Applicants: Kiyoshi Umeda, et al.
U.S. Appl. No. 12/966,757, filed Dec. 13, 2010. Applicants: Makoto Torigoe, et al.
U.S. Appl. No. 12/966,848, filed Dec. 13, 2010. Applicants: Senichi Saito, et al.
U.S. Appl. No. 12/966,837, filed Dec. 13, 2010. Applicants: Mitsuhiro Ono, et al.
U.S. Appl. No. 13/019,253, filed Feb. 1, 2011. Applicants: Arata Miyagi, et al.
U.S. Appl. No. 12/966,769, filed Dec. 13, 2010. Applicants: Tohru Ikeda, et al.
U.S. Appl. No. 12/966,743, filed Dec. 13, 2010. Applicants: Ryosuke Iguchi, et al.
Japanese Office Action from Japanese counterpart appl No. 2010-225746, dated Aug. 6, 2013.

* cited by examiner

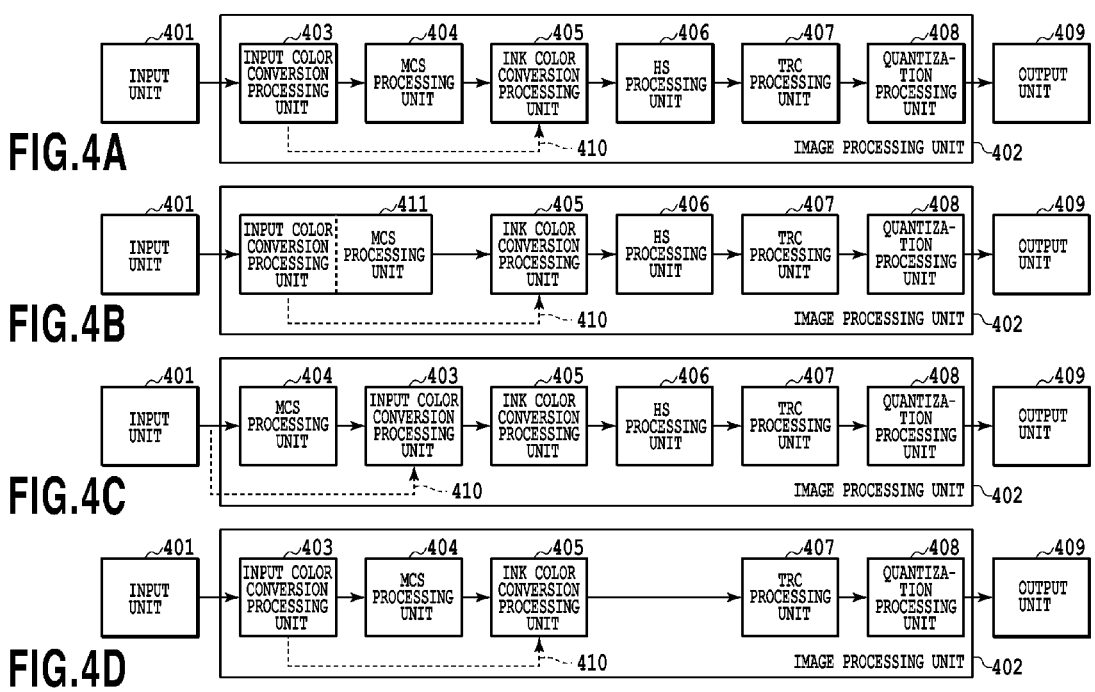

IMAGE PROCESSING APPARATUS, IMAGE PROCESSING METHOD, AND PRINTER

BACKGROUND OF THE INVENTION

1. Field of the Invention

The present invention relates to an image processing apparatus, an image processing method, and a printer.

2. Description of the Related Art

A plurality of ink ejection nozzles designed to eject the predetermined ejection amount practically eject different ejection amounts due to manufacturing variations. Accordingly, when the plurality of ejection nozzles are used to form an image on a printing medium with the number of uniform printing dots, a density variation due to the manufacturing variations and the like may occur. Japanese Patent Laid-open No. H10-013674 (1998) discloses a head shading technique that, in order to settle the density variation, acquires information on ink amounts ejected from respective ink ejection nozzles, and according to the information on ink amounts, modulates the number of printing dots.

Meanwhile, even in the case of using the head shading technique as described above, when two or more inks are superimposed to perform color reproduction, a phenomenon in which color development in a region where printing is performed with nozzles having different ejection amounts from a standard one is different from a color that should have been printed, i.e., a so-called color shift occurs. That is, only by the head shading technique, even if density unevenness of a single color image is corrected, on an image expressed by superimposing two or more inks, the color shift may occur according to a variation in ejection characteristic among a plurality of nozzles. If the ejection characteristic is different among the plurality of nozzles, a degree of the color shift is different between printed regions, and this is recognized as color unevenness.

When colorimetry of the occurrence site of such color unevenness is performed with a colorimeter, a colorimetric error may occur. For example, a spectrophotometric colorimeter performs the colorimetry by reading reflected light within a certain spot diameter. However, color unevenness in a region having a width smaller than the spot diameter, up to in a region surrounding the color unevenness, is read by the spectrophotometric colorimeter. For this reason, it is difficult to accurately perform the colorimetry of the color unevenness. Also, in the case of an image input device such as a scanner, there are some cases where metamerism occurs depending on a degree of accuracy of a sensor, where color difference cannot be discriminated depending on the number of bits upon generation of an input image, and others, i.e., human visual accuracy may not be reproducible.

SUMMARY OF THE INVENTION

An object of the present invention is to provide an image processing apparatus, printer, and image processing method being capable of accurately and efficiently reducing color unevenness in a color image, which is formed by color mixture of a plurality of different types of inks due to a variation in ejection characteristic among nozzles that eject the inks.

The present invention provides an image processing apparatus that performs color correction processing for a color signal that is associated with each pixel of image data to be printed on a printing medium and includes a plurality of components in a predetermined color space, the image processing apparatus includes a memory configured to store a conversion table having a plurality of table parameters, each of the table parameters being assigned for each of a nozzle or a predetermined number of nozzles used for printing in a common region of the printing medium in a plurality of nozzle arrays, respectively, the plurality of nozzle arrays ejecting a plurality of inks including a first ink and a second ink having a different color from the first ink; a correction unit configured to perform the color correction processing for the color signal using at least one of the table parameters assigned to a nozzle corresponding to the color signal of the each pixel; a first output unit configured to output a signal that causes the plurality of nozzle arrays to eject at least both of the first and second inks in a common region of the printing medium so as to print a test color image; a first reception unit configured to receive information on a color correction region to be subjected to color correction in the test color image, the information being based on a result of the output of the test color image output by the first output unit; a generation unit configured to generate a plurality of correction candidate values used for the color correction processing of the color signal corresponding to the color correction region in the test color image; a second output unit configured to output a signal that causes the plurality of nozzle arrays to print a plurality of different color correction images on the printing medium, the plurality of different color correction images being subjected to a plurality of different types of color correction processing with use of the plurality of correction candidate values; a second reception unit configured to receive information on a color correction image selected from the plurality of different color correction images, the information being based on a result of the output of the plurality of different color correction images output by the second output unit; and a formation unit configured to form at least one of the table parameters based on the color correction processing corresponding to the selected color correction image, the at least one of the table parameters being assigned to a nozzle corresponding to the color correction region, wherein each of the plurality of correction candidate values generated by the generation unit has a larger color difference than a predetermined threshold value in a uniform color space with respect to the color signal corresponding to the color correction region.

Further features of the present invention will become apparent from the following description of exemplary embodiments (with reference to the attached drawings).

BRIEF DESCRIPTION OF THE DRAWINGS

FIGS. 4A to 4D are block diagrams illustrating configurations of image processing units in inkjet printers according to a first embodiment of the present invention and variations of the first embodiment;

DESCRIPTION OF THE EMBODIMENTS

Embodiments of the present invention will hereinafter be described in detail with reference to the drawings.

Figure 1:
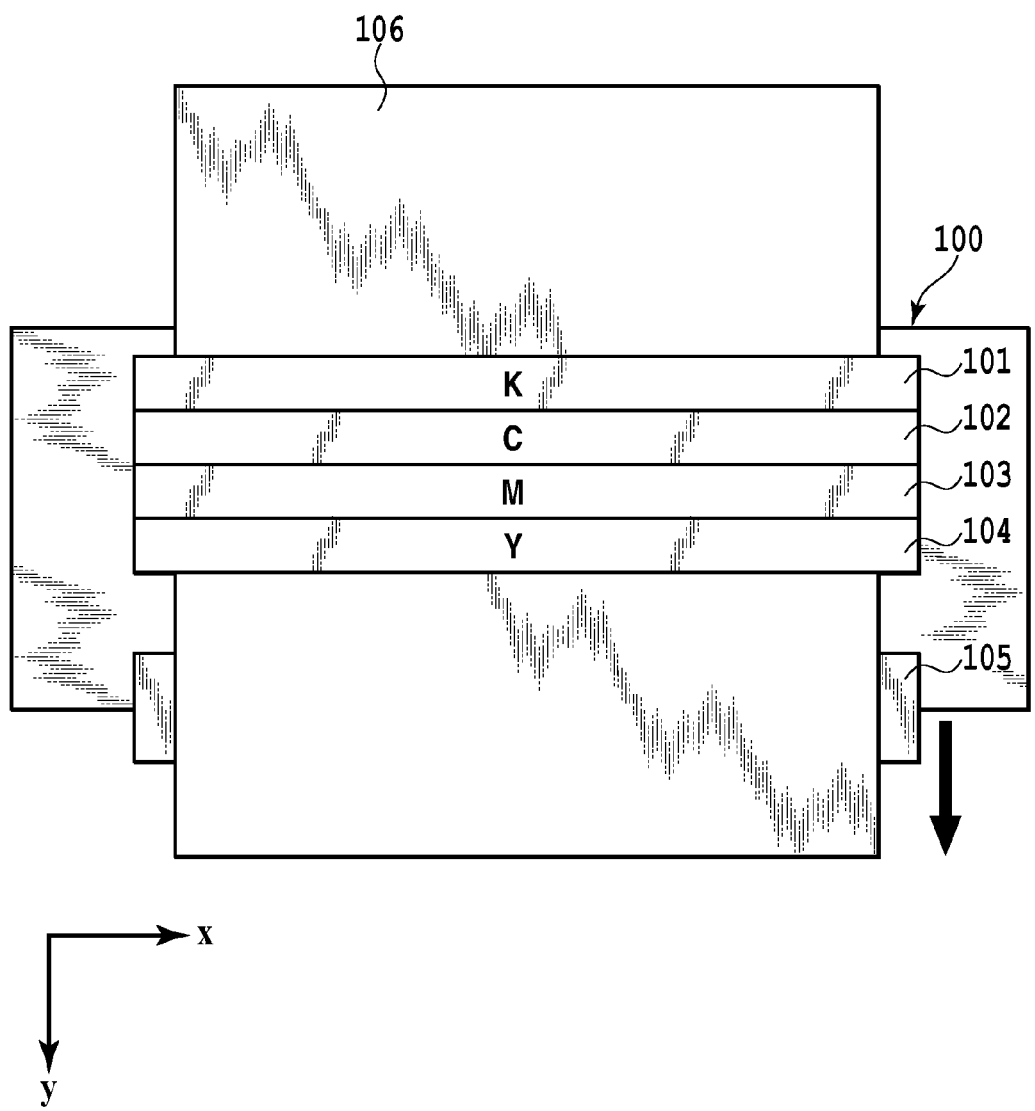
FIG. 1 is a diagram schematically illustrating an inkjet printer according to one embodiment of the present invention.

FIG. 1 is a diagram schematically illustrating an inkjet printer (inkjet printing device) according to one embodiment of the present invention. As illustrated in FIG. 1, the printer 100 is provided with printing heads 101 to 104 on a frame serving as a structural material of the printer. Each of the printing heads 101 to 104 is a so-called full-line type one in which a plurality of nozzles for ejecting black (K), cyan (C), magenta (M), or yellow (Y) ink are arranged along an x-direction in an area corresponding to a width of printing paper 106. A resolution of the nozzle arrangement in the nozzle array of each of the ink colors is 1200 dpi.

The printing paper 106 as a printing medium is conveyed in a y-direction indicated by an arrow in the diagram by a conveying roller 105 (and another roller not illustrated in the diagram) that is rotated by driving force of a motor (not illustrated). Also, while the printing paper 106 is conveyed, from the pluralities of nozzles of the respective printing heads 101 to 104, the inks are ejected according to printing data. This allows one raster images corresponding to the nozzle arrays of the respective printing heads to be sequentially printed. By repeating such ink ejection operation from the respective printing heads onto the printing paper that is being conveyed, for example, a one-page image can be printed. Note that the printer to which the present invention can be applied is not limited to the full-line type printer described above. It is obvious from the following description that the present invention can also be applied to, for example, a so-called serial type printer that scans printing heads in a direction intersecting with a conveying direction of printing paper to perform printing.

Figure 2:
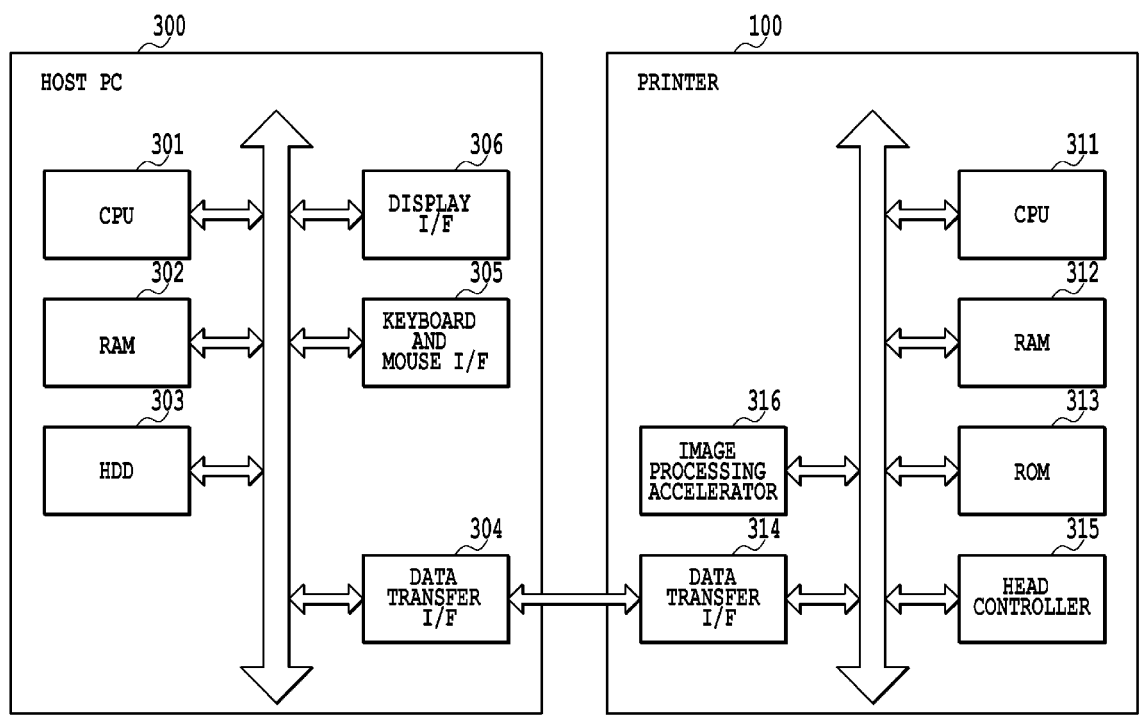
FIG. 2 is a block diagram illustrating a printing system according to one embodiment of the present invention.

FIG. 2 is a block diagram illustrating a configuration of a printing system according to one embodiment of the present invention. As illustrated in the diagram, the printing system is configured to have the printer 100 illustrated in FIG. 1, and a personal computer (PC) 300 as a host device for the printer 100.

The host PC 300 has the following elements. A CPU 301 performs processing according to a program stored in an HDD 303 or RAM 302. The RAM 302 is a volatile storage, and temporarily stores programs and data. Also, the HDD 303 is a nonvolatile storage, and also stores programs and data. A data transfer I/F (interface) 304 controls data transmission/reception with the printer 100. As a connecting method for the data transmission/reception, a USB, IEEE 1394, LAN, or the like can be used. A keyboard/mouse I/F 305 is an I/F that controls HIDs (Human Interface Devices) such as a keyboard and mouse, and a user can provide input through the I/F. A display I/F 306 controls display on a display (not illustrated).

On the other hand, the printer 100 has the following elements. A CPU 311 performs processing in each embodiment, which is to be described later with FIG. 9 and subsequent drawings, according to a program stored in a ROM 313 or RAM 312. The RAM 312 is a volatile storage, and temporarily stores programs and data. Also, the ROM 313 is a nonvolatile storage, and can store table data generated by processing in each embodiment, which is to be described later with FIG. 4 and subsequent drawings, and programs.

A data transfer I/F 314 controls data transmission/reception with the PC 300. A head controller 315 supplies printing data to the respective printing heads 101 to 104 illustrated in FIG. 1, and also controls the ejection operation of the printing heads. Specifically, the head controller 315 can be configured to read control parameters and printing data from a predetermined address of the RAM 312. When the CPU 311 writes the control parameters and printing data into the above predetermined address of the RAM 312, the head controller 315 activates processing to perform ink ejection from the printing heads. An image processing accelerator 316 is hardware that performs image processing faster than the CPU 311. Specifically, the image processing accelerator 316 can be configured to read parameters and data necessary for the image processing from a predetermined address of the RAM 312. When the CPU 311 writes the parameters and data into the above predetermined address of the RAM 312, the image processing accelerator 316 is activated to perform the predetermined image processing. In the present embodiment, generation processing of table parameters used in an MCS processing section, which is to be described later in each embodiment with FIG. 4 and subsequent drawings, is performed on the basis of software processing by the CPU 311. On the other hand, image processing upon printing, which includes processing by the MCS processing section, is performed on the basis of hardware processing by the image processing accelerator 316. Note that the image processing accelerator 316 is not an essential element, and it should be appreciated that the above generation processing of the table parameters and image processing may be performed only on the basis of the software processing by the CPU 311.

In the following, there are described embodiments that are intended to reduce color unevenness that occurs due to a variation in ejection characteristic among the plurality of nozzles when the plurality of types of inks are used to print an image in the printing system described above.

Figure 3A:
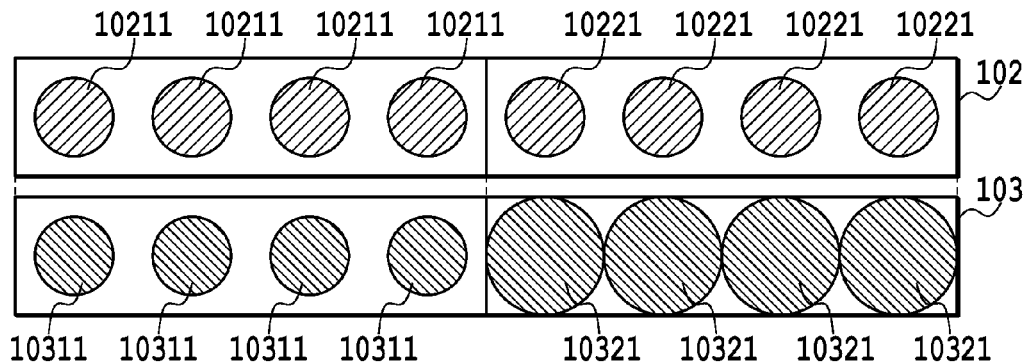
FIGS. 3A to 3C are diagrams for describing color unevenness occurring when a blue image is printed.
Figure 3B:
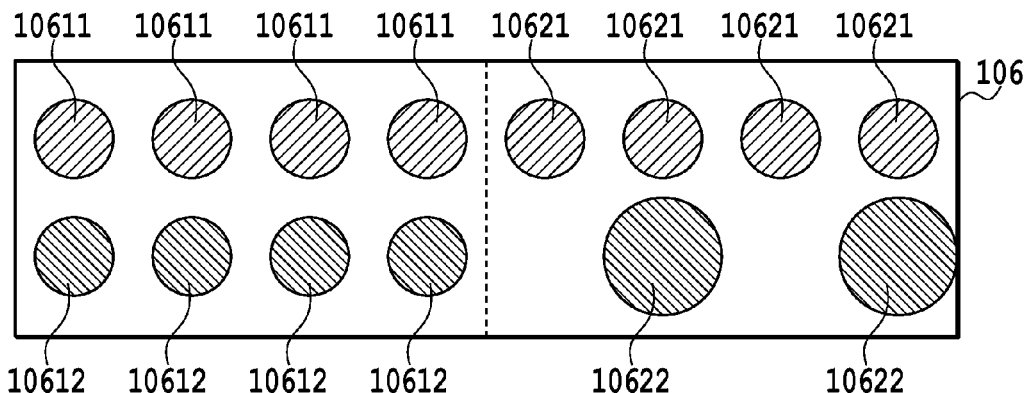
Figure 3C:
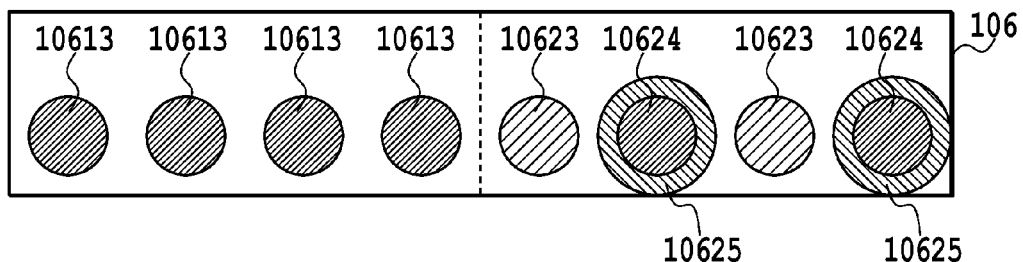

FIGS. 3A to 3C are diagrams for describing color unevenness occurring when a blue image that is expressed by superimposition (color mixture) of two color inks with the conventional head shading being performed is printed. In FIG. 3A, Reference numeral 102 represents the printing head that ejects the cyan ink serving as first ink, and 103 represents the printing head that ejects the magenta ink serving as second ink having a different color from the first ink. In the diagram, for the purpose of simplification of the description and illustration, only eight nozzles among the plurality of nozzles in each of the printing heads are illustrated. Also, in order to describe the color unevenness for the case where the blue is printed with the cyan and magenta inks, only the two printing heads for cyan and magenta inks are illustrated.

The eight nozzles 10211 and 10221 of the printing head for the cyan ink 102 can all eject the ink having a standard amount in a standard direction, and print dots having the same size on a printing medium at regular intervals. On the other hand, the eight nozzles of the printing head for the magenta ink 103 all have the standard ejection direction; however, it is assumed that four nozzles 10311 on the left side of the diagram have the standard ejection amount, but four nozzles 10321 on the right side have ejection amount larger than the standard. Accordingly, in a left side region (first nozzle area) in the diagram, magenta dots having the same size as cyan dots are printed, whereas in a right side region (second nozzle area), magenta dots having a larger size than the cyan dots are printed at the same regular intervals as those for the cyan dots. Note that the right side four nozzles of the printing head for the magenta ink 103 illustrated in FIG. 3A are illustrated as ones having larger size than that of the left side four nozzles; however, this is only for facilitating understanding of a difference in ejection amount, and does not illustrate a relationship in actual nozzle size.

In the case of using the printing heads having such ejection amount characteristics, if a correction of image data is made on the basis of the conventional head shading, image data corresponding to the magenta nozzles 10321 are corrected so as to decrease values thereof. As a result, dot data (binary data) that set printing (1) or non-printing (0) of dots is generated such that the number of dots finally printed by the magenta nozzles 10321 is suppressed to be smaller than the number of dots printed by the magenta nozzles 10311.

FIG. 3B illustrates cyan dots 10611 and 10621 corresponding to the nozzles of the printing head for the cyan ink 102, and magenta dots 10612 and 10622 corresponding to the nozzles of the printing head for the magenta ink 103. Among them, dots 10622 in a region corresponding to the four nozzles 10321 having the larger magenta ink ejection amount are reduced in terms of the number of dots as a result of correcting image data in the above corresponding region by the head shading. The example illustrated in the diagram is an example where the area of the dot formed by the ink ejected by the magenta ink nozzles 10321 having the larger ejection amount is twice as large as that for the case of the nozzles having the standard ejection amount. In this case, the number of dots is halved (four dots→two dots) by the correction based on the head shading. In addition, the description that the number of dots is halved when the dot area is doubled is only for the purpose of descriptive simplification. It should be appreciated that, in practice, the number of dot data is set such that an increase (decrease) in density due to an increase (decrease) in the dot area by a variation in ejection amount is suppressed to meet a standard density.

FIG. 3C illustrates an example where on the basis of the dot data obtained in the above manner, the cyan and magenta inks are ejected on the printing paper 106 from the respective printing heads to print the blue image. In FIG. 3C, in a left side region of the diagram in the printing paper 106, blue dots 10613 that is formed by superimposing the cyan and magenta inks and have the standard size are printed. On the other hand, in a right side region of the diagram, which corresponds to the four nozzles 10321 having the larger magenta ejection amount, cyan dots 10623 having the standard size and dots each including a blue area 10624 formed by superimposing the cyan and magenta inks and a magenta area 10625 surrounding the blue area 10624 are printed.

As described, the region where blue (solid image) is printed, which corresponds to the nozzles 10321 having the larger magenta ejection amount on the right side of the diagram includes the following three types of dots or areas:

The two cyan areas (dots) 10623 having the standard size, the two blue areas 10624 each based on the cyan dot having the standard size formed in the magenta dot larger than the standard, and the two magenta areas 10625 each present around the blue area having the standard size 10624.

As described above, in the conventional head shading, the cyan and magenta image data are separately corrected, and thereby the respective numbers of dots are adjusted. As a result, the area of the two cyan areas (dots) 10623=the area of the two blue areas 10624=the area of the two magenta areas 10625. In this case, if a color observed as a whole on the basis of optical absorption characteristics of the cyan areas 10623 and magenta areas 10625 is the same as a color observed on the basis of an optical absorption characteristic of the blue areas 10624, the entire region has the same color as that of the blue areas 10624.

However, in the case where an area is formed with a plurality of different color inks superimposed as the blue area 10624, a color observed on the basis of an optical absorption characteristic of a corresponding area is often different from a color that is observed as a whole on the basis of a combination of optical absorption characteristics of areas corresponding to the plurality of inks respectively. As a result, a corresponding entire region has a color shift from a target standard color, and consequently in the printing paper 106, the blue image in the left side region of the diagram and the blue image in the right side region are respectively viewed as different colors.

In addition, even in a multi-value printer that can change a dot size, such as a four-value printer that performs printing with three step dots, i.e., large, medium, and small dots, a variation in size of each of dots having respective sizes may occur due to a variation in ejection amount among nozzles. In this case, even if a correction based on the conventional head shading is made, color unevenness may also occur for the same reason as above. Accordingly, without limitation to a two-value printer, the present invention can also be applied to a multi-value printer using three or more values.

The embodiments of the present invention reduce color unevenness of a printing image by performing correction processing of a color signal defining a value of each pixel in image data before quantization.

(First Embodiment)

FIG. 4A is a block diagram illustrating a configuration of an image processing unit in an inkjet printer according to a first embodiment of the present invention. That is, in the present embodiment, respective elements for controlling and processing the printer 100 illustrated in FIG. 2 configure the image processing unit. It should be appreciated that application of the present invention is not limited to the present embodiment. For example, the image processing unit may be configured in the PC 300 illustrated in FIG. 2, or a part of the image processing unit may be configured in the PC 300 and the other parts may be configured in the printer 100.

As illustrated in FIG. 4A, an input unit 401 inputs image data transmitted from the host PC 300 to pass it to the image processing unit 402. The image processing unit 402 has an input color conversion processing section 403, MCS (Multi Color Shading) processing section 404, ink color conversion processing section 405, HS (Head Shading) processing section 406, TRC (Tone Reproduction Curve) processing section 407, and quantization processing section 408.

In the image processing unit 402, first, the input color conversion processing section 403 converts the input image data from the input unit 401 to image data corresponding to a color reproduction range of the printer. The image data to be input are, in the present embodiment, data indicating color coordinates (R, G, B) in a color space coordinate system such as sRGB that is an expression color system of a monitor. The input color conversion processing section 403 converts the input image data R, G, B each having 8 bits to the image data (R', G', B'), which correspond to a color signal formed from three components and are within the color reproduction range of the printer, on the basis of known methods such as matrix calculation processing or processing using a three-dimensional lookup table. In the present embodiment, a three-dimensional lookup table is used along with interpolation calculation to perform the conversion processing. Note that a resolution of the 8-bit image data handled in the image processing unit 402 is 600 dpi, whereas a resolution of binary data obtained by quantization in the quantization processing section 408 is 1200 dpi as will be described later.

The MCS processing section 404 performs color correction processing of the image data to which the conversion is performed by the input color conversion processing section 403. This processing is, as will be described later, also performed with use of a correction table (conversion table) based on a three-dimensional LUT. The three-dimensional LUT has a plurality of table parameters assigned for every predetermined number of nozzles used for printing in the same area on the printing medium, in the plurality of nozzle arrays respectively ejecting the plurality of inks. Among the plurality of table parameters, table parameters assigned to nozzles corresponding to the RGB signal serving as a color signal of each pixel in the image data are used to perform the color correction processing of the RGB signal. Based on the correction processing, even if there may be a variation in ejection characteristic among nozzles of a printing head in an output unit 409, the above-described color unevenness due to the variation can be reduced. Specific table content in the MCS processing section 404 and the correction processing using the table will be described later. Note that, in the present embodiment, the following description is provided on the assumption that the MCS processing section 404 is configured to input an RGB signal value and to output an RGB signal value corrected by the three-dimensional LUT. However, if an input signal value in the ink color conversion processing section 405 to be described next is CMYK, the MCS processing section 404 can also be configured to have a system that inputs the RGB signal value and outputs a CMYK signal value. In this case, the MCS processing section 404 holds a three-dimensional LUT that converts the RGB signal value to the CMYK signal value. Also, if the input color conversion processing section 403 can output the CMYK signal value, the MCS processing section 404 may hold a four-dimensional LUT for the CMYK signal value, and input the CMYK signal value to output a CMYK signal value.

The ink color conversion processing section 405 converts the image data formed by the signal having 8 bits for each of R, G, B, which is processed by the MCS processing section 404, to image data formed by color signal data for inks used in the printer. The printer 100 of the present embodiment uses black (K), cyan (C), magenta (M), and yellow (Y) inks, and therefore the image data based on the RGB signal are converted to the image data formed by the color signal having 8 bits for each of K, C, M, Y. This color conversion is also, in the same manner as the above-described input color conversion processing section 403, performed with use of a three-dimensional LUT together with interpolation calculation. Note that as another conversion method, as described above, a method such as matrix calculation processing can also be used.

The HS processing section 406 performs processing that inputs the image data based on the ink color signal and converts, for each of the ink colors, the 8-bit data to image data based on an ink color signal corresponding to ejection amounts of the respective nozzles configuring the printing head. That is, the HS processing section 406 performs the same processing as the conventional head shading processing. In the present embodiment, a one-dimensional LUT is used to perform the present HS processing.

The TRC processing section 407 makes a correction for adjusting the number of dots printed in the output unit 909 for each of the ink colors on the HS processed image data based on the ink color signal having 8 bits for each of the colors. In general, the number of dots printed on a printing medium, and an optical density achieved by the dots having the number on the printing medium do not have a linear relationship. Accordingly, in order to make the relationship linear, the TRC processing section 407 corrects the image data having 8 bits for each of the colors to adjust the number of dots to be printed on the printing medium.

The quantization processing section 408 performs quantization processing of the image data for the ink colors each having 8 bits and 256 values, which are processed in the TRC processing section 407, to obtain 1-bit binary data. At this time, in the present embodiment, first, the conversion to index data having 3 bits and 5 values of "0" to "4" is performed for each of the ink colors. The index data "0" to "4" corresponds to a pattern in which 0 to 4 dots are arranged on 2 pixels× pixels having a resolution of 1200 dpi. It should be appreciated that, to apply the present invention, a configuration of the quantization 408 is not limited to this embodiment. For example, A configuration in which 8-bit image data are binarized to directly obtain binary data (dot data) may be provided. Also, as a method for the quantization processing, the present embodiment employs an error diffusion method; however, another pseudo halftone processing such as a dither method may be employed.

The output unit 409 drives the printing heads to eject the respective color inks on the printing medium for printing on the basis of the dot data obtained by the quantization. The output unit 409 is configured specifically on the basis of a printing mechanism provided with the printing heads 101 to 104 illustrated in FIG. 1.

Figure 5:
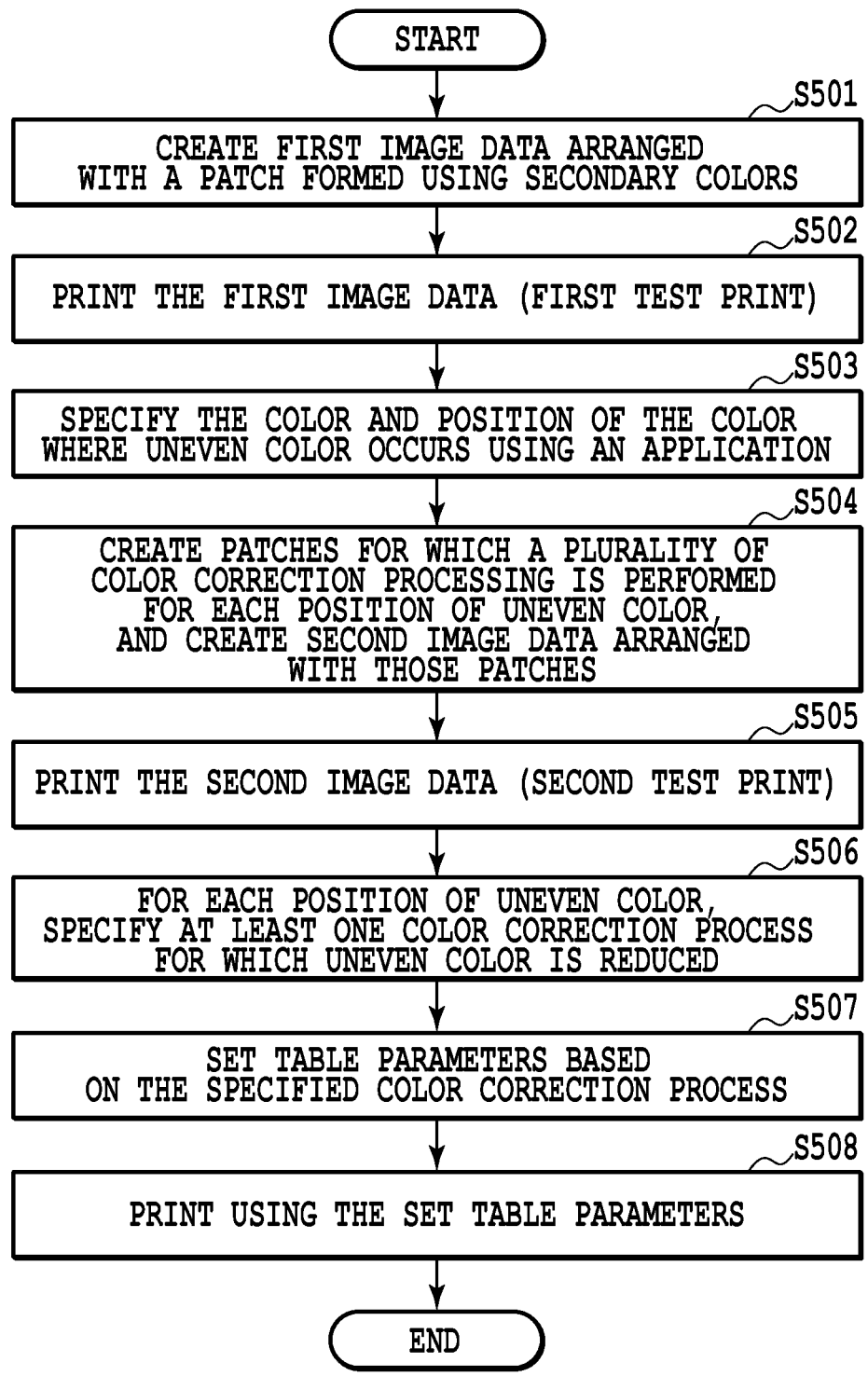
FIG. 5 is a flowchart illustrating processing that generates parameters of a table used in the MCS processing section illustrated in FIG. 4A, and processing using the above table by the MCS processing section in image processing upon generation of printing data.

FIG. 5 is a flowchart illustrating processing that generates parameters of a table used in the MCS processing section 404 illustrated in FIG. 4A, and processing using the above table by the MCS processing section in image processing upon generation of printing data.

In FIG. 5, Steps S501 to S507 are processing steps of generating the parameters of the three-dimensional lookup table used in the MCS processing section 404. Specifically, S501 is a processing step of generating the image data input in the input unit 401. S502 is a processing step of performing printing with the printer through the input color conversion processing section 403 to the output unit 409. S503 is a processing step of specifying an occurrence region of color unevenness by using the keyboard and mouse on the host PC 300. S504 is a processing step of, on the basis of the region specified at S503, generating the image data input in the input section 401. S505 is a processing step of performing printing with the printer similarly to S502. S506 is a processing step of specifying the image processing by using the keyboard and mouse on the host PC 300. S507 is a processing step of generating the parameters of the three-dimensional LUT used in the MCS processing section 404. In the present embodiment, such parameter generation processing is forcibly or selectively performed when the printer is manufactured or used for a predetermined period of time, or when a predetermined amount of printing is performed. Alternatively, for example, every time printing is performed, the parameter generation processing may be performed before the printing operation. That is, this processing can be performed as calibration, and on the basis of this, the table parameters corresponding to content of the LUT are updated.

Step S508 is a processing step that is, in order to generate printing data to perform printing with the printer, performed as part of the image processing in the image processing unit 402 illustrated in FIG. 4A by the image processing accelerator 316.

In the present embodiment, the table parameters of the MCS processing section 404 are generated on the assumption that the table parameters of the HS processing section 406 have been generated. For this reason, at the time of Step S501 when the present processing is activated, the table parameters of the HS processing section 406 have already been generated (updated) by a known method. When the table parameters of the HS processing section are generated, a variation in density expressed on the printing medium is suppressed for each of the ink colors. For this reason, the parameters are generated such that, for example, in the case of a nozzle having a relatively large ejection amount, the number of ejections is decreased, whereas in the case of a nozzle having a relatively small ejection amount, the number of ejections is increased. Accordingly, for example, regarding the nozzles 10321 of the magenta head 103 illustrated in FIG. 3A, a parameter is generated to decrease the number of dots to approximately a half as illustrated in FIG. 3B. Also, regarding the cyan head 102, a parameter is generated not to change the number of dots as illustrated in FIG. 3B. As described above, in the present embodiment, when the table parameters of the MCS processing section 904 are generated or updated, the table parameters of the HS processing section 406 are prepared beforehand. Based on this, when the parameters of the MCS processing section 404 are generated, the color unevenness due to a variation in ejection characteristic among the nozzles can be appropriately reduced by both the processing in the MCS processing section 404 and that in the HS processing section 406.

Also, in the present embodiment, as described above, the MCS processing section 404 is described as the system that inputs the RGB signal value and outputs the RGB signal value. On the other hand, in the processing for obtaining the table parameters, as will be described later, there exists processing that handles the colors to be printed on the printing medium. At this time, parameters that can reproduce colors on a printing medium in the case of the standard ejection amount are preferably prepared for each printing medium, such as an LUT that converts the RGB signal value to an L*a*b* value or CMYK value. Alternatively, a conversion expression that converts the RGB signal value to an L*a*b* value on a printing medium may be held. Based on this, a conversion value of the input value for expressing a desired color on a printing medium in the present embodiment can be estimated. In particular, in the processing step of Step S504 to be described later, color conversion processing can be performed on the basis of a color on the printing medium. For this reason, before the processing illustrated in FIG. 5, a printer profile for each printing medium or an LUT used in the ink color conversion processing section 405 is preferably held in the MCS processing section 404.

Accordingly, before the processing illustrated in FIG. 5, a printing medium used to generate the table parameters for the MCS processing is specified through the host PC 300. Also, correspondingly, the printer profile for each printing medium or the LUT used in the ink color conversion processing section 405 is copied from the ROM 313 of the printer main body 100 into the RAM 302 of the host PC 300. A printing medium may be manually specified from a prepared printing medium list by the user, or automatically sensed by the printer main body 100, and a result of the sensing may be transferred to the host PC 300.

At S501, the host PC 300 generates an image in which test color images (patches) having a plurality of colors including a secondary color is laid out. At this time, if patches having 256 gradations and 16.77 million colors are generated, enormous cost is required. For this reason, for each of R, G, B, signal values 0 to 255 may be divided by, for example, 17, and for all of the combinations (lattice points) of 17×17×17, patches may be printed. Alternatively, the image may be generated by a method in which the user selects hues in which color unevenness is concerned, and patches included in the hues are laid out. That is, in order to reduce a memory capacity and work time, among the above lattice points, lattice points at which color unevenness is likely to be particularly significantly varied due to ejection characteristics are selected, and only for combinations of R, G, B corresponding to the lattice points, patches are printed. Also, it is only necessary that one of the lattice points includes, for example, (R, G, B)=(0, 0, 255) corresponding to the blue image illustrated in FIG. 3. Regarding the selection of colors (lattice points) with which the test color images are printed, it is only necessary that, for example, combinations of R, G, B of which color unevenness becomes larger than a predetermined level depending on an ejection amount are set, and depending on a calculation load or memory capacity, the types (combinations of color signals) and number of patches are set. Also, not the RGB lattice points, but the above-described printer profile or LUT used in the ink color conversion processing section 405 may be used to generate the image such that the patches are arranged at regular intervals in a uniform color space.

On the other hand, near a patch, an identifier that enables nozzle position information to be known is added with being related to the patch. As the identifier, for example, a numeral or scale is added, i.e., a known method may be used. The image generated in this manner is defined as first image data.

Figure 6:
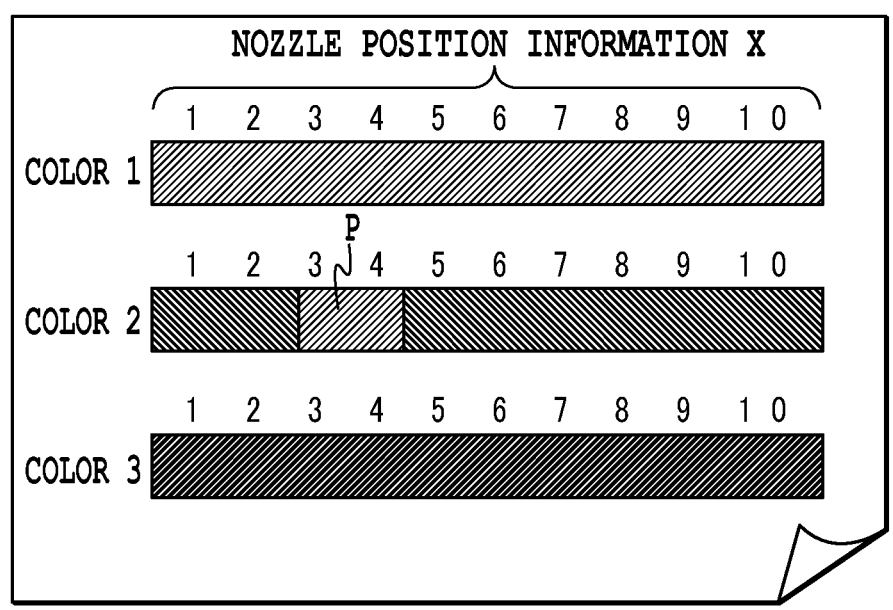
FIG. 6 is a diagram illustrating layouts of test color images.
Figure 10A:
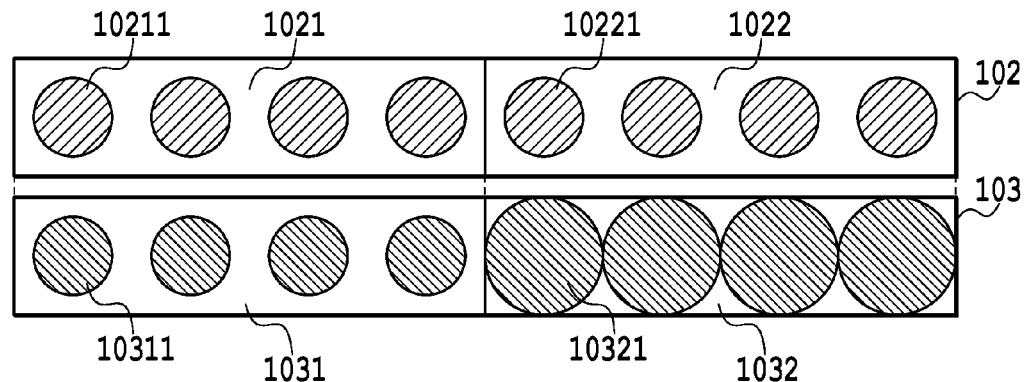
FIGS. 10A and 10B are diagrams for describing printing states of test color images.
Figure 10B:
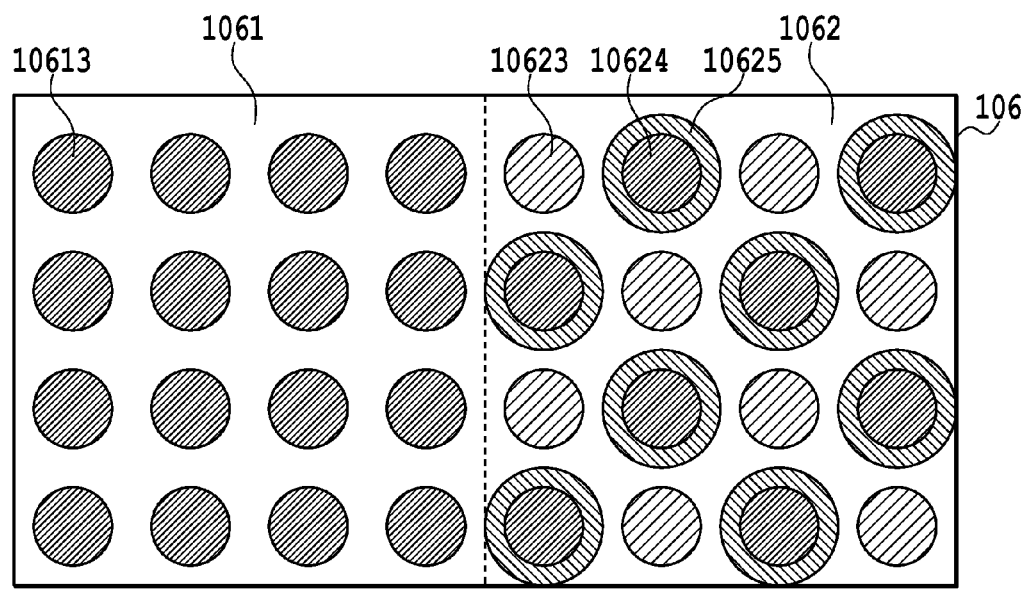

At S502, the first image data generated at S501 are printed (first output unit). This is referred to as first test print. An example of a layout of the first test print is illustrated in FIG. 6. When the print processing is started, from all of the nozzles of the respective printing heads illustrated in FIG. 1, the inks are ejected to print patches on a printing medium. When the patches are printed, several sets of selected image data (R, G, B) are input to the ink color conversion processing section 405 without being processed in the MCS processing section 404, as the image data having been subjected to the processing in the input color conversion processing section 403 (hereinafter referred to as device color image data D[X]). Such a path is indicated by a dashed line 410 as a bypass path in FIG. 4A. The processing based on the bypass path may be performed such that, for example, a table meeting "input value=output value" is prepared, and although the device color image data D[X] is input to the MCS processing section 404, an input value is directly output independently of X. Then, in the HS processing section 406, TRC processing section 407, and quantization processing section 408, the same processing as that for normal data is performed, and then the test color images are printed on the printing paper 106 in the output unit 409. During the processing, the image data for the test color images expressed by (R, G, B) are converted to the image data (C, M, Y, K) based on the ink color signals by the ink color conversion processing section 405. At this time, for example, if one of the image data for the test color images includes (R, G, B)=(0, 0, 255), a corresponding signal value is (K, C, M, Y)=(0, 255, 255, 0), i.e., the conversion to data based on which cyan and magenta are printed on a 100% basis is performed. Subsequently, by the processing in the HS processing section 406 and subsequent sections, the image data meeting (K, C, M, Y)=(0, 255, 255, 0) are printed as the dot data illustrated in FIG. 3B. In the following description, for the purpose of simplification of the description, only table parameters corresponding to lattice points indicating image data for the blue test color images are described in terms of parameter generation processing. Note that X refers to information indicating, in the printing heads 101 to 104 illustrated in FIG. 1, positions of nozzles for the respective colors in the x-direction on a four-nozzle basis. In the MCS processing in the present embodiment, the processing is performed on a nozzle basis having the predetermined number of (four) nozzles, and image data is corrected on the nozzle basis. Also, the device color image data D[X] refers to image data to be printed with four nozzles arranged in an X area for each of the ink colors. FIGS. 10A and 10B are diagrams for describing printing states of the test color images at the above Step S502. In FIGS. 10A and 10B, the same elements as those illustrated in FIGS. 3A to 3C are denoted by the same symbols, and description thereof is omitted.

FIG. 10A illustrates the case where, similarly to FIG. 3A, among the nozzles of the magenta printing head 103, the four nozzles corresponding to the second area respectively have larger ejection amounts than the standard. Accordingly, the HS processing is applied to the image data (K, C, M, Y)=(0, 255, 255, 0) exhibiting blue, and thereby the blue test color images as illustrated in FIG. 10B are printed. That is, in the second area including the nozzles having the larger ejection amounts than the standard, color unevenness occurs, and therefore patches having different color development from the standard blue in the first area are printed.

The user views the printing state with his/her eyes, and can thereby identify from the first test print which nozzle positions of what color unevenness occurs in. For example, in FIG. 6, the user can identify that color unevenness occurs in "nozzle positions 3 to 4" of "Color 2".

However, if the table parameters are preliminarily generated in the MCS processing section 404 before the present processing is performed, the image data is input to the ink color conversion processing section 405 through the processing in the MCS processing section 404. Note that the table parameters used in the MCS processing section 904 are ones that are updated at the time when color unevenness is found before the present processing. In such a case, although in the above case, in FIG. 4A, the dashed line 410 is used as the bypass path, the MCS processing section 404 can be passed through.

Next, at S503, the user specifies in an application the color and nozzle positions (occurrence region) through which the user checked the color unevenness in the first test print. That is, patches in which the color unevenness occurs, and the occurrence regions of the color unevenness in the patches (color correction regions to be subjected to the color correction processing) are specified. The host PC 300 instructs the display 306 as a display unit to display the respective patches. The patches in which the color unevenness occurs and the occurrence regions, can be specified by using the input devices such as the mouse and keyboard. The host PC 300 as a first reception unit receives information on the specifying operation to recognize the patches to be subjected to the color correction processing and the color correction regions of them.

Figure 7:
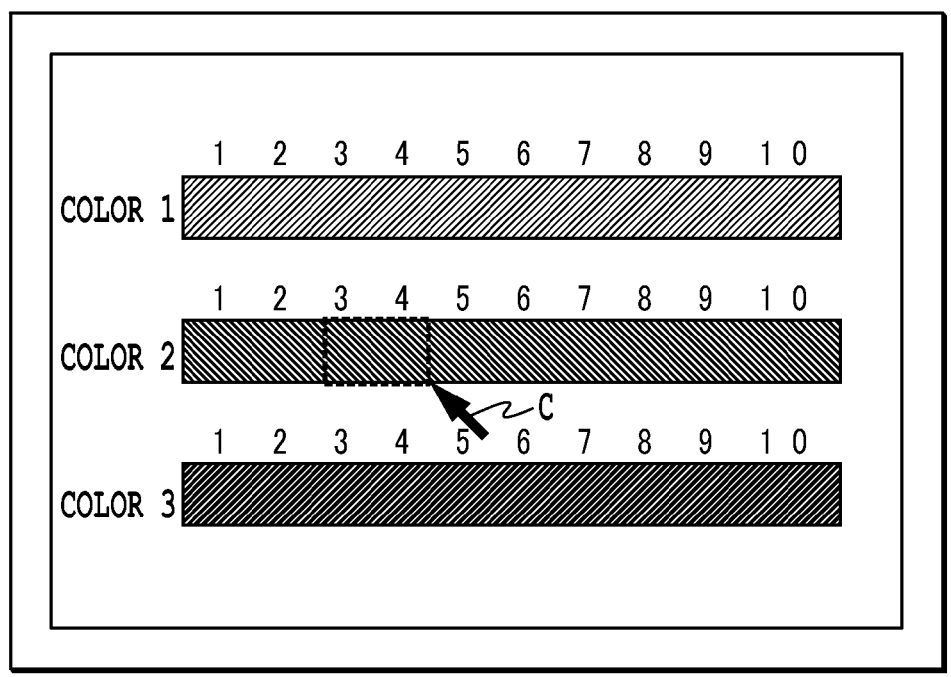
FIG. 7 is a diagram illustrating a user interface for specifying an occurrence region of color unevenness in the test color images.

A user interface of the application that performs the processing is illustrated in FIG. 7. In the case where, in the first test print illustrated in FIG. 6, the occurrence region P of the color unevenness is detected in "nozzle positions 3 to 4" of "Color 2", a corresponding region of the color unevenness is specified in FIG. 7. As a method for the specification, for example, it is only necessary to specify positions of both ends of the color unevenness (nozzle positions 3 and 4) on a patch for "Color 2" displayed in FIG. 7 with a cursor C. Also, if a density gradient is present within the color unevenness occurrence region (color correction region), a unit configured to select a position may be provided, where the color unevenness most intensively appears, i.e., a maximum position of a color unevenness intensity (characteristic point), on the patch of FIG. 7. As processing for this case, the color correction processing performed at S504 is performed such that as a position comes close to the maximum position, a degree of the processing is increased, whereas as a position comes close to the both end positions of the color unevenness, the degree of the processing is decreased. By doing so, even if there is a density gradient in the color unevenness, the color correction processing can be modified depending on a nozzle position. On the other hand, when the color and nozzle positions of the color unevenness are specified, not with use of the cursor as illustrated in FIG. 7, a method that numbers the color and nozzle positions to specify the color and nozzle positions with the numbers may be employed.

Subsequently, at S504, the color correction processing is performed on the color and nozzle positions specified at S503. Color correction images (color correction patches) that are configured only with use of the color specified at S503, in which a plurality of different types of color correction processing are performed on the specified nozzle positions, are generated, and image data in which the color correction patches are laid out are generated. Near the color correction patches, identifiers that enable nozzle position information to be known are added with being related to the patches. This is defined as second image data. At this time, regarding the plurality of different types of color correction processing, it is only necessary to generate a plurality of points that are separated from the color of the first test print by an arbitrary distance in the color space. A diagram in which the image data are printed is FIG. 8.

To describe details of Step S504, the blue test color images at the lattice points where the device color image data D[X] correspond to (R, G, B)=(0, 0, 255) are printed by the cyan and magenta printing heads 102 and 103 illustrated in FIG. 1. In the following, an n-th area is defined as X=n. At S503, for a color (i.e., lattice points) specified as a color in which a tendency of color unevenness is largely varied, a table parameter is obtained for each of the positions corresponding to the specified nozzles (i.e., on an area [X] basis). Also, table parameters for lattice points other than the above specified lattice points are obtained by interpolation between the specified lattice points. As a method for obtaining the table parameters based on the interpolation, a known method can be used, and description thereof is omitted. Here, each area [X] corresponds to a region of four nozzles having the resolution of 1200 dpi, whereas the pixel resolution in the image processing is 600 dpi, and therefore each area X corresponds to two pixels in the x direction.

An X value of the area [X] specified at S503 is assumed to be n. A table corresponding to the area [n] is generated by adding m color correction values $Zi[n]$, which are obtained by varying values from image data (R, G, B) at a corresponding lattice point in respective RGB directions, to device color image data D[n]. Note that the subscript i is a color correction number for the case of performing the plurality of different types of color correction processing. For example, in the case where (R, G, B) of "Color 2" specified in FIG. 7 is blue (0, 0, 255), a first color correction value $Z1[n]$ of the blue (0, 0, 255) corresponding to the area [n] is set to (10, 0, 0), as described above. Then, as a second color correction value, $Z2[n]$ is set to (0, 10, 0). Further, as a third color correction value, $Z3[n]$ is set to (0, 0, 10). Then, the specified lattice point RGB is added with the color correction values $Zi[n]$ according to the following expression to obtain device color image data after color correction Di[X] (second color signal). That is, a relationship between the first color signal D[X] and the second color signal Di[X] is as follows: Device color image data after color correction $Di[n]=D[n]+Zi[n]$ In the present example, for the first area that is not specified as color unevenness, the color correction processing is not performed. Accordingly, D[1] is unchanged. That is, the color correction processing in the MCS processing is not performed. On the other hand, regarding the n-th area that is specified as color unevenness, $Zi[n]\neq 0$, and therefore in the MCS processing, Di[n] is subjected to the correction because it is different in color from D[n].

The m patches generated in this manner are parallel laid out in an image to generate image data. In the above example, the RGB value is used as a reference to make the color correction, however, for example, the conversion to a uniform color space (L*, a*, b*) may be performed, and m color corrected patches may be generated at regular intervals in the space. That is, the above-described printer profile or LUT used in the ink color conversion processing section 905 is used to convert the first color signal D[X], second color signal Di[X], or color correction value Zi[n] to an L*a*b* value or CMYK value for processing. Regarding corresponding processing steps, first, an RGB value of the first color signal D[X] is converted to an L*a*b* value with the printer profile. Then, the color correction value Zi[n] represented by the L*a*b* value is added to obtain the second color signal Di[X]. Finally, the printer profile is used to perform the interpolation processing based on inverse calculation, and thereby the color correction based on the L*a*b* value can be made.

Also, depending on a position in a color space, a magnitude of the color correction value Zi[n] may be varied. For example, human visual perception can highly accurately discriminate a difference in color around gray, and therefore the magnitude of the color correction value Zi[n] is decreased. By doing so, the color correction processing can be finely performed. On the other hand, the human visual perception cannot highly accurately discriminate color unevenness in a low lightness region or high color saturation region as compared with around gray, and therefore the magnitude of the color correction value Zi[n] may be increased.

That is, in the case where, independently of color space coordinates of the device color image data D[X], a fixed value that is statically set in advance in the RGB space is added to generate the color image data Di[n], and then test print is performed, the following problems arise:

(1) If the number of patches near a region where color unevenness occurs (hereinafter referred to as the number of candidate colors) is too large, it is difficult to select an optimum patch in a short period of time, and a down time of the image processing apparatus is increased.

(2) If the number of candidate colors is too large, the number of sheets of paper necessary for the test print is increased, which relatively leads to an increase in cost of a deliverable.

For these reasons, in the present embodiment, an optimum number of color image data Di[n] (hereinafter referred to as correction candidates) adapted to the human visual characteristics is generated.

Figure 16:
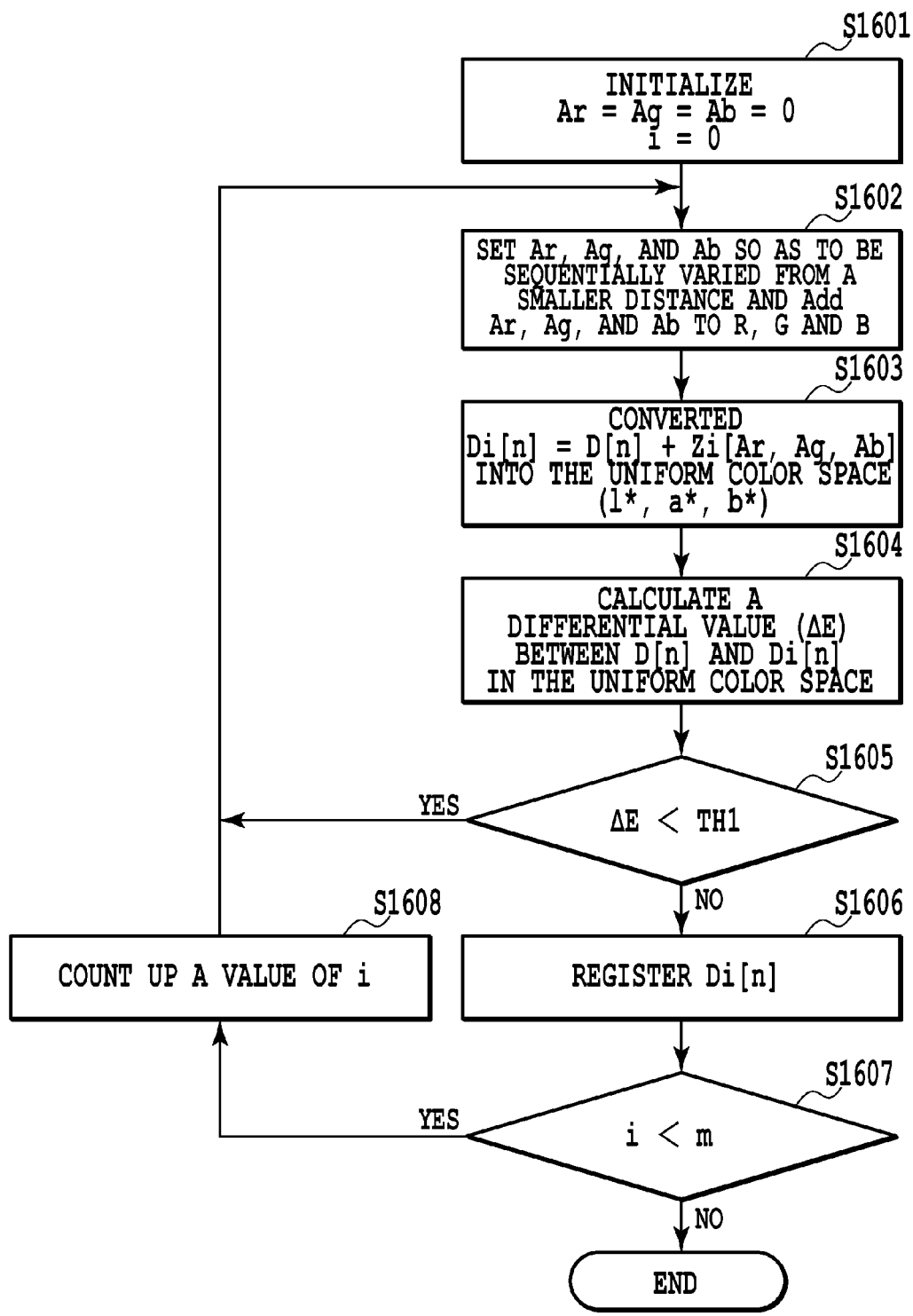
FIG. 16 is a flowchart illustrating a procedure for generating correction candidates in the first embodiment of the present invention.

FIG. 16 is a flowchart illustrating an operational procedure for generating the correction candidates. It is assumed that an R component additional value, G component additional value, and B component additional value of the correction value Zi[n] are respectively denoted by Ar, Ag, and Ab. First, at Step S1601, initialization is performed to set Ar=Ag=Ab=0. Then, at Step S1602, the additional values Ar, Ag, and Ab are set so as to be sequentially varied from a smaller distance value of the correction value Zi[n] from a color D[n] at a lattice point to be corrected, and the set additional values Ar, Ag, and Ab are added to R, G, and B components of the color D[n] at the lattice point. Specifically, a step number of each of the additional values Ar, Ag, and Ab to be varied is set to 1. That is, each of the additional values Ar, Ag, and Ag is varied as +1, −1, +2, −2, +3, −3, and so on. At this time, the distance from the color D[n] at the lattice point is varied as 1, $\sqrt{2}$, $\sqrt{3}$, and so on.

In this case, at Step S1602, a value of (Ar, Ag, Ab)=(1, 0, 0) for the case of the above distance of 1 is added. Then, when the flow returns to Step S1602 through processing steps from Step S1603 to Step S1605, a value of (Ar, Ag, Ab)=(0, 1, 0) is added. Subsequently, when the flow also returns to Step S1602, (Ar, Ag, Ab)=(0, 0, 1), (−1, 0, 0), (0, −1, 0), and (0, 0, −1) are sequentially added (subtracted). After that, when the flow returns to Step S1602 next, a correction value meets the above distance of $\sqrt{2}$, and every time the flow returns, values of (Ar, Ag, Ab)=(1, 1, 0), (0, 1, 1), (1, 0, 1), (−1, 1, 0), (0, −1, 1), (−1, 0, 1), (1, −1, 0), (0, 1, −1), (1, 0, −1), (−1, −1, 0), (0, −1, −1), and (−1, 0, −1) are sequentially added (subtracted). Subsequently, when the flow returns to Step S1602 in the same manner, the additional values Ar, Ag, and Ab are varied as +2, −2, +3, −3, and so on to set the additional values such that the above distance $\sqrt{((Ar^2)+(Ag^2)+(Ab^2))}$ is sequentially varied from a small value to a large value).

In addition, it should be appreciated that the order in which the additional values Ar, Ag, and Ab are varied is, but not limited to, the order of Ar, Ag, and Ab in the above example. As far as a rule is observed in which, after all of the combinations for the case where the distance from the color D[n] at the lattice point is 1 have been processed, a transition to the processing of the next combinations for the case of the distance of $\sqrt{2}$ is made, any order may be employed.

Then, at Step S1603, on the basis of a correction value Zi[Ar, Ag, Ab] having the additional values obtained in the above manner as the components, Di[n]=D[n]+Zi[Ar, Ag, Ab] that is a candidate color signal obtained as a result of correcting the color D[n] at the lattice point to be corrected is converted into the uniform color space (L*, a*, b*). Note that the conversion from the RGB space to the (L*, a*, b*) space is based on a known technique, and therefore description thereof is omitted.

Subsequently, at Step S1604, a differential value (ΔE) between D[n] and Di[n] in the uniform color space is calculated. Here, when the differential value (ΔE) can be expressed by $\sqrt{(\Delta L^2)+(\Delta a^2)+(\Delta b^2)}$, and also given that an Lab value of Di[n] is (L1, a1, b1), and an Lab value of D[n] is (L2, a2, b2), $$\Delta L = L1 - L2,$$

$$\Delta a = a1 - a2, \text{ and}$$

$$\Delta b = b1 - b2.$$

Then, at Step S1605, it is determined whether or not ΔE obtained in the above manner is smaller than a preset threshold value TH1. Here, the threshold value TH1 is one that indicates whether or not a color difference can be discriminated, and set on the basis of the human visual characteristics. For example, according to the description of Japanese Patent Laid-open No. 2000-301807, provisions of JIS and various organizations define that at 0.8 to 1.6, "a color difference is sensed by adjacent comparison", and therefore in the present embodiment, the threshold value TH1 is set to 1.6.

At Step S1605, if it is determined that the color difference ΔE is smaller than the threshold value, the human visual perception recognizes the difference as the same color, and therefore on the assumption that a correction with a correction value corresponding to the color difference is meaningless, the flow returns to Step S1602 without setting a correction candidate value. Then, as described above, the additional values Ar, Ag, and Ab are varied to repeat the processing steps form Step S1602 to Step S1605. On the other hand, at Step S1605, if it is determined that the color difference ΔE is equal to or more than the threshold TH1, different colors are visually recognized, and therefore at Step S1606, a correction value corresponding to the color difference is set as a correction candidate value, and Di[n] obtained by making the correction with the correction value is registered as data for a candidate patch (candidate color).

Finally, at Step S1607, while making comparisons with the number of candidate colors m in which values of i are preset, the processing steps from Step S1602 to Step S1606 are repeated until the value of i reaches m.

Note that the above-described calculation of ΔE is described on the assumption of the CIE1976 color difference model; however, the calculation may be performed on the basis of the corrected CIE1994 color difference model, or the CIE2000 color difference model more true to the visual characteristics.

As described, in the present embodiment, only a correction candidate value having a larger color difference than a predetermined threshold value in the uniform color space for a color signal corresponding to the color correction region is generated. That is, a color difference in the uniform color space between D[n] that is the color signal for the test patch and Di[n] that is separated from D[n] by a predetermined distance and has a varied RGB value is calculated, and Di[n] meeting the color difference ΔE exceeding the predetermined threshold value is set as the correction candidate value. Also, until the number of correction candidate values reaches a predetermined number m, values of RGB serving as the respective elements are varied, and if the number of correction candidate values does not reach the predetermined number m, a distance between D[n] and Di[n] is increased to vary the RGB values.

Further, depending on a nozzle position of the printer, the magnitude of the color correction value Zi[n] may be varied. Depending on a position in a head of the printer, an appearance of color unevenness may be different. For example, in the case where the head includes a plurality of chips, color unevenness may excessively occur in a joining position between chips. In such a case, if a magnitude of a color correction value Zi[n] in the joining position between the chips is increased more than normal, the color unevenness having strong intensity can also be handled.

Among the plurality of different color correction patches, a patch without color correction processing, which is used in the first test print, may be arranged at the same time. By doing so, the user can compare the patch with color correction processing with the patch without color correction processing to thereby check an effect of the color correction processing. Also, at S506, among the plurality of patches, at least one patch is selected; however, depending on an intensity of color unevenness and a magnitude of a color correction value Zi[n], in the patch without color correction processing, color unevenness may least stand out. As an option for the case, by laying out the patch without color correction processing, a selection can be performed to further reduce an error. Further, there is also an effect of eliminating a print trial difference. For example, the above-described patch without color correction processing in the first test print can be used to make a comparison with the plurality of patches with color correction processing; however, if a print trial or a sheet of paper is different, a color of a patch may be different. As a method for settling the problem, a method that prints the patch without color correction processing at the same time becomes effective.

Figure 8:
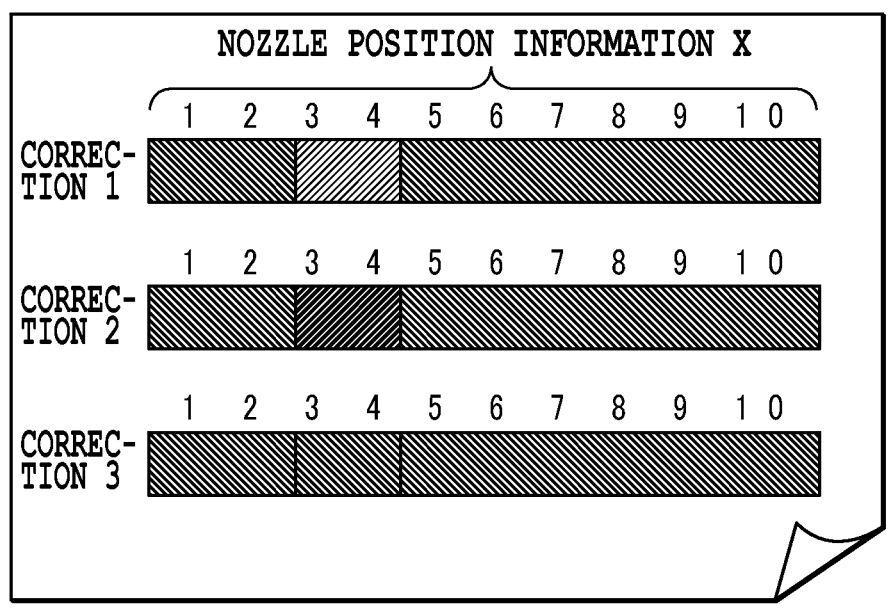
FIG. 8 is a diagram illustrating layouts of candidate color correction images.

At S505, the second image data generated at S504 is printed on a printing medium (second output unit). This is referred to as second test print. The second test print is as illustrated in FIG. 8, and the user can check that the color of the color unevenness in the positions specified at S503 is varied by the plurality of color correction processing.

Figure 9:
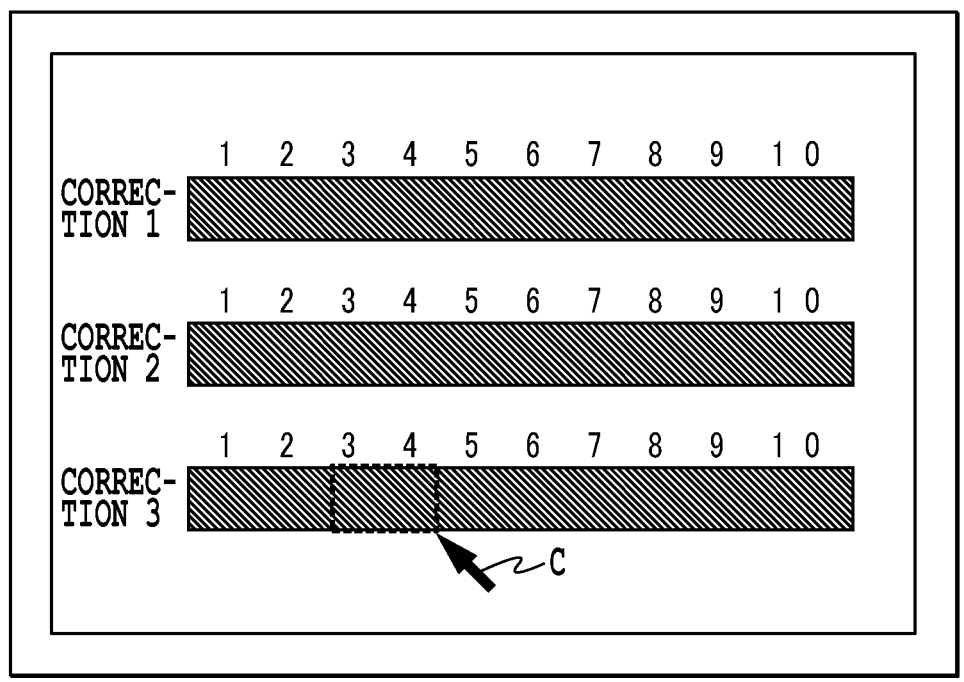
FIG. 9 is a diagram illustrating a user interface for selecting a color correction image to be used from a plurality of candidate color correction images.

At S506, the user visually determines, among a plurality of patches in the second test print, one in which color unevenness is most reduced, and specifies at least one color correction number for it. A user interface of an application for performing this is illustrated in FIG. 9. The host PC 300 instructs the display 306 to display the respective color correction patches. For example, in the case where, among m color correction patches, an i-th color correction patch can be most reduced in terms of color unevenness, in the nozzle positions specified in FIG. 7, "Correction i" is specified. In FIG. 8, color unevenness of "Correction 3" is reduced, and therefore it is only necessary to, in FIG. 9, select "nozzle positions 3 to 4" of "Correction 3" with the cursor. Alternatively, not with the use of the cursor as illustrated in FIG. 9, the color correction and positions may be numbered in the same manner as at S503, and specified with the numbers. Also, if there are two in which color unevenness reduction levels are the same, the two may be specified. The host PC 300 as a second reception unit receives and recognizes information on selected color correction processing.

On the other hand, if any color correction patch cannot be reduced in terms of color unevenness, at least one having the best effect is selected among the color correction patches. Then, the patch is used as a reference to again perform the second test print. That is, the flow returns to S504 to generate the second image data again. The image data generated again are defined as third image data, and printing of the third image data is referred to as third test print.

In the color correction patch selected at this time, the color unevenness is at least reduced as compared with the other color correction patches. In other words, in the other color correction patches that are not selected, magnitudes of color correction values $Zi[n]$ are too large. For this reason, when the third image data are generated, it is only necessary to decrease a magnitude of a color correction value $Zi[n]$ as compared with the second image data. For example, a magnitude of a color correction value $Zi[n]$ generated in the second image data is halved. By doing so, in the third image data, a range where color unevenness reduction is selected is narrowed. That is, the present processing can be converged to narrow down a range of color correction patches in which color unevenness can be reduced.

Also, in the case where, even in the third test print, color unevenness cannot be reduced, it is only necessary to repeat the above-described processing flow to perform fourth or subsequent test print.

Meanwhile, in the above, the processing flow is described for the case where the magnitude of the color correction value $Zi[n]$ in the second test print is large, and therefore the color unevenness cannot be reduced. However, there is also a case where an intensity of color unevenness occurring is large, and therefore the color unevenness cannot be corrected because of a small magnitude of the color correction value $Zi[n]$ in the second test print. In such a case, in the third test print, the magnitude of the color correction value $Zi[n]$ should be increased in an opposite manner. To do this, it is only necessary to specify the magnitude of the color correction value $Zi[n]$ on the user interface when the third test print is performed. By generating an image of the third test print on the basis of a value of the magnitude, a color correction patch that efficiently reduces color unevenness can be generated.

At S507, among the plurality of table parameters of the conversion table used in the MCS processing section 404, a table parameter corresponding to a nozzle position X is changed on the basis of the color correction processing selected at S506. Based on this, a table parameter that can reduce color unevenness depending on an ink ejection characteristic of a nozzle can be generated. In the case where in the second test print at S506, a plurality of correction patches are specified, it is only necessary to perform the color correction processing with, for example, averaging them. Specifically, it is assumed that, among the plurality of specified color correction patches, a first color correction patch is subjected to processing such that an RGB value is color corrected only by (0, 0, 10), and a second color correction patch is subjected to processing such that an RGB value is color corrected only by (0, 10, 0). In this case, regarding the color correction processing that is finally determined, (0, 0, 5) that is obtained by averaging the RGB values may be employed, or (0, 10, 10) that is obtained by the two vectors may be employed. In order to accurately reduce color unevenness with a finite number of color correction patches as illustrated in FIG. 8, employing an additive method that specifies a plurality of color correction patches at the same time as described becomes effective. The newly generated table parameter is set in the MSC processing section 404. A table parameter for each lattice point is stored in a memory with corresponding to the lattice point for each nozzle position. The memory that stores the table parameter at this time is, in the present embodiment, assumed to be the HDD 303 of the host PC; however, it may be a nonvolatile memory provided in the printer main body. In either case, the generated table parameter is preferably handled not to be lost at timing when power is turned off, or by other cause.

At S508, the MSC processing section 404 in which the new table parameter is set is used to print arbitrary image data. This processing step is one that, at the time of normal printing operation, the image processing accelerator 316 performs according to the series of image processing illustrated in FIG. 4A.

First, the image processing accelerator 316 performs the color correction processing with use of the newly generated table parameter on the device color image data D[X] (first color signal). Subsequently, the image processing accelerator 316 performs the processing by the ink color conversion processing section 405, HS processing section 406, TRC processing section 407, and quantization processing section 408 on the obtained device color image data Di[X] (second color signal). Then, according to the obtained binary data, ink dots are printed on the printing paper 106 by the output unit 409.

Figure 11A:
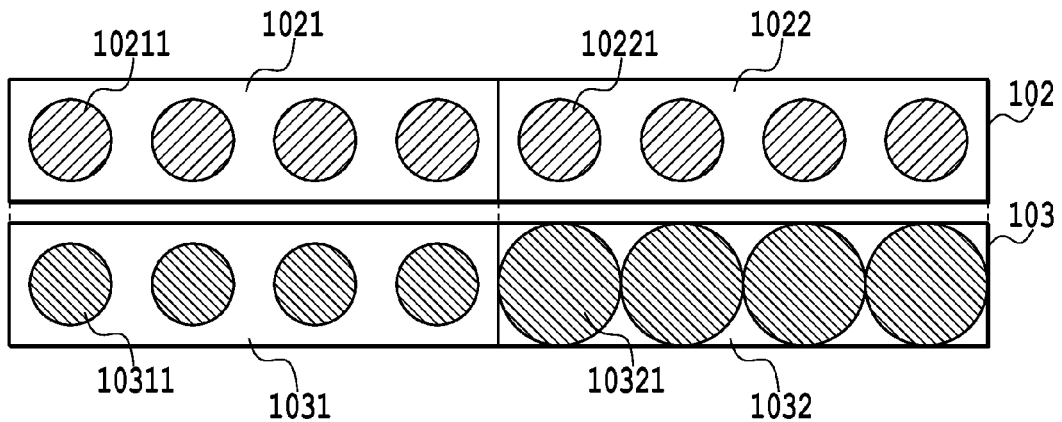
FIGS. 11A and 11B are diagrams for describing an example of images after the processing by the MCS processing section in FIG. 4A.
Figure 11B:
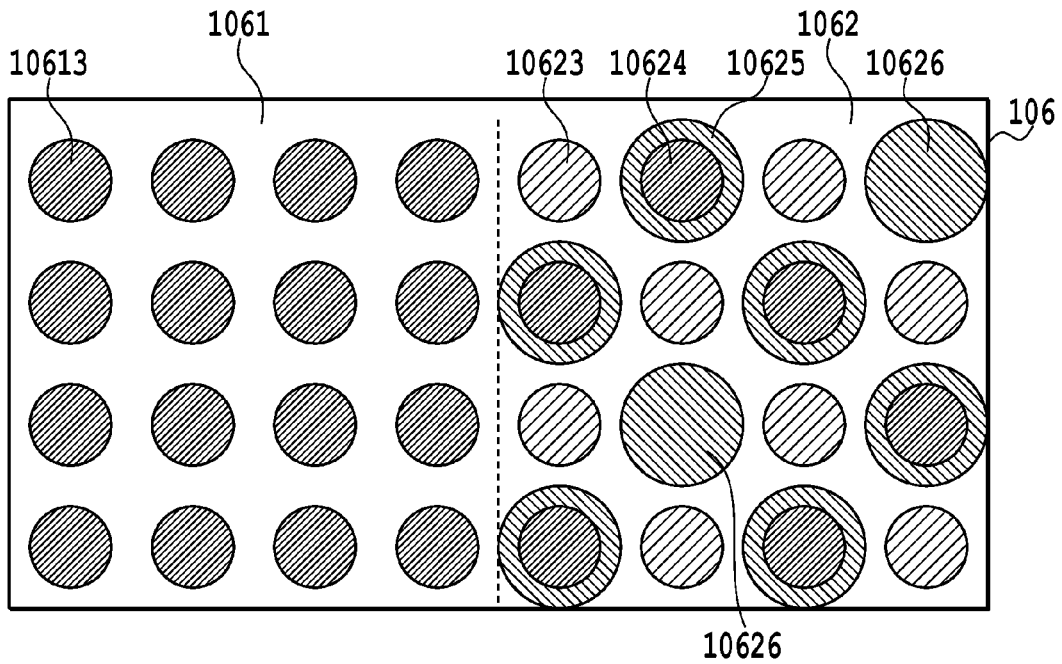

FIGS. 11A and 11B are diagrams for describing an example of the images printed at S508 in FIG. 5. FIG. 11A illustrates ejection amount characteristics of nozzles in the cyan and magenta printing heads 102 and 103, similarly to FIG. 10A. On the other hand, FIG. 11B is a diagram for describing a dot printing state obtained as a result of performing the MCS processing of the present embodiment, which is compared with the printing state that is illustrated in FIG. 10B and obtained as a result of performing only the HS processing. Regarding the n-th area in which it is determined that the cyan color is strong in the state of FIG. 10B where only the HS processing is performed, the MCS processing is performed to generate Di[n] in which the cyan color is reduced in intensity as compared with D[n]. As a result, as compared with the printing state that is illustrated in FIG. 10B and obtained as a result of only performing the HS processing, the number of cyan dots 10623 is reduced. Due to a variation in ejection amount, a certain level of color unevenness occurs; however, a color sufficiently close to a color in which color unevenness does not occur is achieved.

As described above, in the present embodiment, regarding a color (combination of R, G, B) in which a color unevenness tendency is largely varied, test color images (patches) are printed on a printing medium; then the user visually specifies the color in which color unevenness occurs and nozzle positions; and on the basis of a result of the specification, a table parameter is obtained. In general, the color unevenness tendency depends on both (1) a color itself to be printed, and (2) a printing characteristic of each color ink on a printing medium. (1) means that, for example, even if there are the same variations in ejection amount, color unevenness of blue is more likely to stand out than that of red. Also, (2) means elements that influences a size and density of a dot, color development of each ink color in a superimposed dot, and the like, such as, in addition to an ejection amount, an ejecting direction, dot shape, permeability, and type of printing medium.

In addition, a color unevenness amount is one that depends on a combination of printing characteristics of ink colors used for printing a corresponding color, and therefore it should be appreciated that the color unevenness amount does not depend on a printing characteristic of an unused ink color. That is, the types and number of related ink colors are different for each pixel, and depending on a pixel, there may be a case where only one ink color is related, and any color unevenness amount does not occur.

Also, in the above, the case is described, as an example, where all of the four magenta nozzles included in the same area respectively have the larger ejection amounts than the standard; however, there is a sufficient possibility that respective nozzles have different ejection characteristics in one area. Even in such a case, by performing processing that obtains an average amount of color unevenness in the same area, and corrects the color unevenness by all of four nozzles, the above-described effect can be obtained.

Regarding data expressed by a single color of each of the ink colors used in the printer, a density has already been adjusted by the HS processing, and therefore color unevenness does not occur. Accordingly, regarding the color, it is not necessary to make the correction by the MCS processing section 404. Such a state is specifically described below by, as an example, taking the case where a measurement color space and a device color space completely coincide with each other.

In the case where the measurement color space and the device color space completely coincide with each other, a color signal (R, G, B)=(0, 255, 255) is converted to (C, M, Y, K)=(255, 0, 0, 0) in the ink color conversion processing section. Regarding the single color of cyan (C signal), an appropriate density adjustment has already been made by primary conversion of the HS processing, and therefore it is better not to change the cyan data more than the adjustment by the HS processing, or add data on another color. That is, in the case of having such data, it is better to set a correction value for a specified color unevenness area to (0, 0, 0). The same holds true for magenta 100% data (R, G, B)=(255, 0, 255). On the other hand, blue 100% data (R, G, B)=(0, 0, 255) are data not represented by a single color ink used in the printer but represented by a combination of the cyan and magenta inks. Accordingly, as has already been described using FIG. 3, even if the HS processing is performed, color unevenness may occur. For this reason, in the example illustrated in FIG. 10B, $$Zi[n] \neq (0,0,0),$$

and therefore an appropriate correction is made by the MCS processing.

Figure 12:
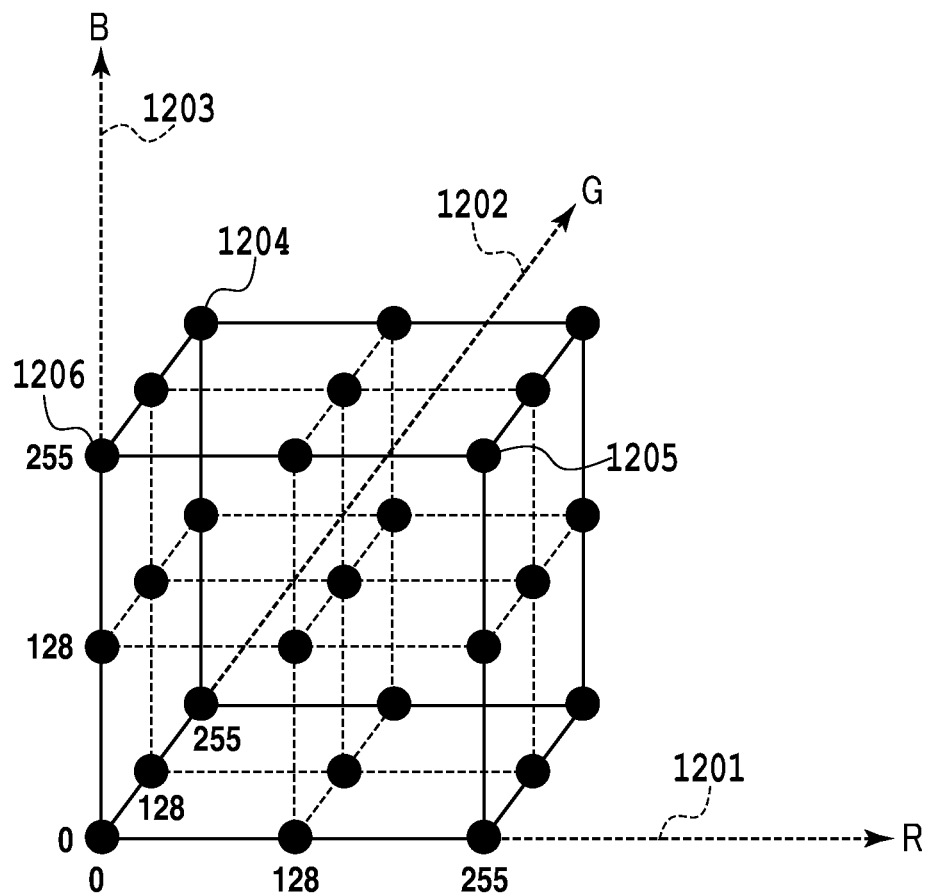
FIG. 12 is a diagram illustrating lattice points of which coordinates are determined at regular intervals in an RGB space.

As described, in the three-dimensional RGB space, lattice points requiring the MCS processing and lattice points not requiring it are present, and a degree of the correction varies depending on a signal value (lattice point position). Accordingly, if color unevenness is required to be suppressed in the entire area of the color space, it is desirable to prepare correction signal values of the MCS processing for all RGB values. However, if on the basis of all RGB combinations, patches are printed, colorimetry is performed, correction values are calculated, or a region where obtained correction values are printed is prepared, a processing load is increased, which leads to an increase in capacity of a memory, or an increase in processing time. Accordingly, as in the present embodiment, it is preferable to: select, in the RGB space, several colors in which color unevenness corrections are particularly required; print test color images (patches) with signal values corresponding to the colors; and obtain equivalent correction values for them to generate a table. However, in the case where a color in which a color unevenness tendency is large is not particularly limited, there may be provided a configuration in which, for example, as illustrated in FIG. 12, correction values may be obtained respectively for 27 lattice points of which coordinates are placed at regular intervals in the RGB space. In either case, it is only necessary that patches are printed for some specific color signals, and on the basis of correction values obtained from the patches, table parameters are generated. By doing so, when an image is actually printed, interpolation processing can be performed on the basis of information on a plurality of discrete parameters to prepare a parameter corresponding to a desired signal value.

In the above-described series of application processing is described on the assumption that the processing is performed in the host PC 300 illustrated in FIG. 2; however, for example, the processing steps from S501 to S507 may be performed in an external PC other than the host PC 300.

As described above, in the present invention, an RGB signal value is input/output in the MCS processing section 404. There are three advantages specific to the inkjet printer, which are based on control with an RGB signal value, and the advantages are described below.

The first advantage is that a data capacity can be reduced. In the case of performing processing with an ink color signal, at least four signal values for CMYK are required. In general, an inkjet printer employs, in addition to CMYK, light cyan (Lc) lighter than C, light magenta (Lm) lighter than M, and the like. Only up to this, the six color inks, i.e., six signal values are required. Further, depending on an inkjet printer, inks of gray (G), red (R), green (G), and the like are employed, and when combining them, nine color inks are present in total. As described above, in the MCS processing section 409, the processing is performed with use of the LUT, and therefore if the processing is performed on the basis of an ink color signal, the number of combinations of the colors, i.e., a data capacity, is enormously increased. In an inkjet printer, color development is different depending on ink permeation, and therefore a characteristic of the color development is nonlinear. For this reason, a lattice point spacing of the three-dimensional LUT should be made fine, and consequently the number of lattice points is increased. As described above, as the number of colors (degrees) is increased, the number of lattice points (i.e., a data capacity) is exponentially increased. In addition, the MCS processing section 404 holds table parameters for each nozzle area, and therefore a system load is further increased. For example, consider an LUT for 8-bit (1-Byte) signal values. In the case of preparing 17 lattice points for one color, an RGB LUT requires 4913 lattice points that correspond to the cube of 17, and is therefore an LUT having 1 Byte×3 signal values×4913 points=approximately 15 kBytes. On the other hand, in the case of four colors of CMYK, an LUT requires 83521 lattice points that correspond to the fourth power of 17, and requires 1 Byte×4 signal values×83512 points=approximately 334 kBytes. That is, by increasing the number of colors only by 1, in the above example, the data capacity is increased as much as approximately 22 times. Incidentally, if there are 100 nozzle areas, the four-dimensional LOT for CMYK finally requires a data capacity of approximately 33 Mbytes. The present invention relates to a technique that performs ejection control, and it is thought that an ink color signal is directly controlled; however, in the present embodiment, in consideration of the advantage of reducing a data capacity, the MCS processing section 404 performs the processing with three component values of the RGB signal.

The second advantage is that an unexpected situation due to ink amount saturation can be avoided. If an LUT for an ink color signal is changed in the present processing, ink permeation into a printing medium is influenced. In an inkjet printer, an ink driving amount is set depending on a printing medium. However, in the case of performing the second test print at S505, or other case, ink color signal values may be largely changed from conventional values depending on a patch, and thereby an ink amount may exceed a saturation amount of a printing medium. As a result, the printing medium is output from a printer with printed ink on the printing medium being less dried than usual. This makes a hand of the user dirty, or makes internal parts of the inkjet printer main body dirty to cause a sensor not to normally operate, which consequently leads to a failure of the printer. For this reason, by controlling, rather than CMYK signal values that controls ink ejecting amounts, RGB signal values independent of them, such problems can be avoided. In the present embodiment, to prevent the situation as described above from erroneously occurring, the processing in the MCS processing section 404 is performed with three components of the RGB signal.

Figure 13:
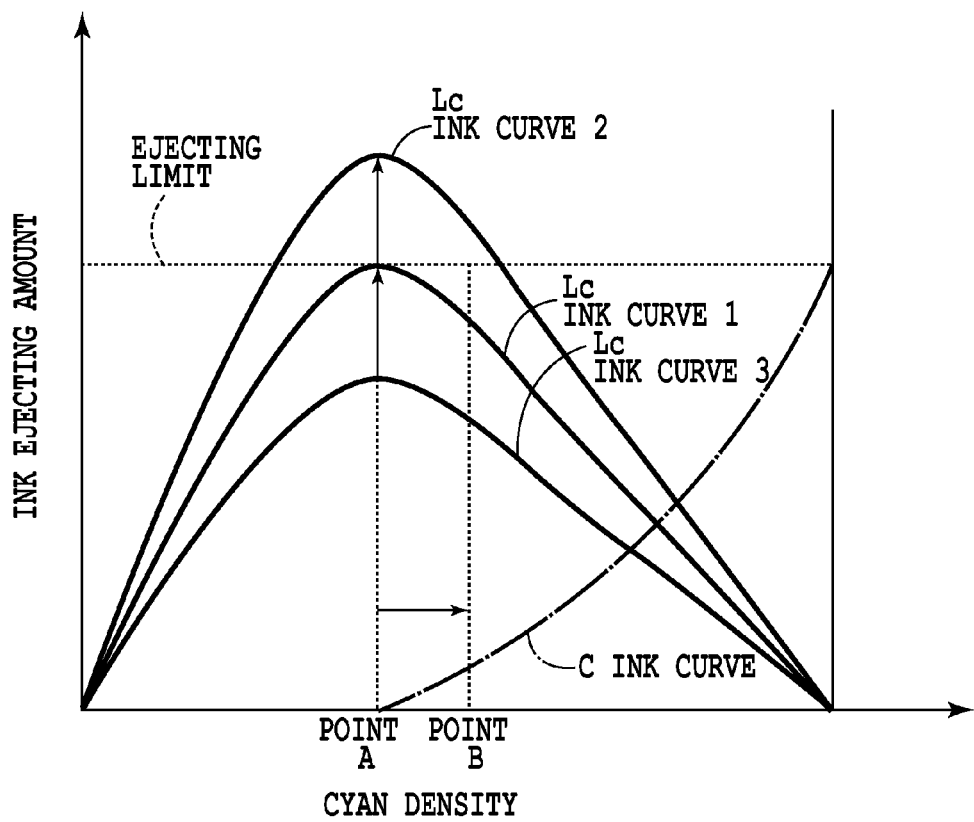
FIG. 13 is a graph illustrating a relationship between an ink driving amount and a density of a cyan hue.

The third advantage is that graininess of a printed image can be reduced. As an example, consider an ink usage for the case of a gradation from a density value of 0 to a maximum cyan density value in a cyan hue (from light cyan to dark cyan). In FIG. 13, a driving curve of the Lc ink is defined as an "Lc ink curve 1", and a driving curve of the C ink is defined as a "C ink curve". From a state where a density is 0, driving of the Lc ink is started, and an amount of the Lc ink is gradually increased. Then, the driving amount of the Lc ink is decreased, and instead a driving amount of the C ink is increased by the same amount as the decrease. In this manner, the cyan gradation can be reproduced. At this time, if in a state where the driving amount of the Lc ink reaches a driving limit (saturation amount), i.e., in a state where a cyan color is darkened with the Lc ink, the C ink is driven, the graininess can be reduced. Based on such a characteristic of an inkjet printer, as the LC ink usage is increased, a more effect in reducing the graininess is produced. In the present invention, in the second test print at S505, a patch of which a density is varied with respect to the patch having the color specified at S503 is printed. However, at this time, if the patch having the color specified at S503 corresponds to the point A in FIG. 13, to generate a patch having a higher density than the patch with CMYK signal values, the Lc ink driving amount should be increased from the "Lc ink curve 1" to an "Lc ink curve 2". However, at this time, the Lc ink driving amount exceeds the driving limit. On the other hand, in order to prevent the driving amount from being saturated while varying the ink driving amount, the Lc ink driving amount should be reduced in advance. That is, the Lc ink driving amount should follow an "Lc ink curve 3". However, in the case of the "Lc ink curve 3", the Lc ink usage is small, and the graininess stands out. Here, as the advantage of the present invention, in consideration of the advantage of reducing the graininess, the "Lc ink curve 1" is used to generate the second test print not with CMYK values but with RGB signal values. When a color correction patch is generated, for example, by converting the point A to a point 13, the second test print can be generated without changing an ink driving condition.

(First Variation)

FIG. 4B is a block diagram illustrating another example of the configuration of the image processing unit in the inkjet printer according to the present embodiment. In FIG. 4B, respective sections indicated by Reference numerals 401, and 405 to 409 are the same as the respective sections indicated by the same Reference numerals in FIG. 4A, and therefore description of them is omitted. In the present variation, a different point from the configuration illustrated in FIG. 4A is that the input color conversion processing section and the MCS processing section are configured to be an integrated processing section. That is, an input color conversion processing & MCS processing section 411 of the present variation is a processing section that has both of the functions of the input color conversion processing and the MCS processing together.

Specifically, the input color conversion processing & MCS processing section 411 uses one table in which the table of the input color conversion processing section and that of the MCS processing section are synthesized. That is, the table is used to perform the color correction processing of a color signal in the sRGB color space, and also convert the color signal to a color signal in the RGB color space that is different from the sRGB color space. Based on this, correction processing of color unevenness can be directly performed on input image data from the input unit 401 to output device color image data in which the color unevenness is reduced.

Figure 14:
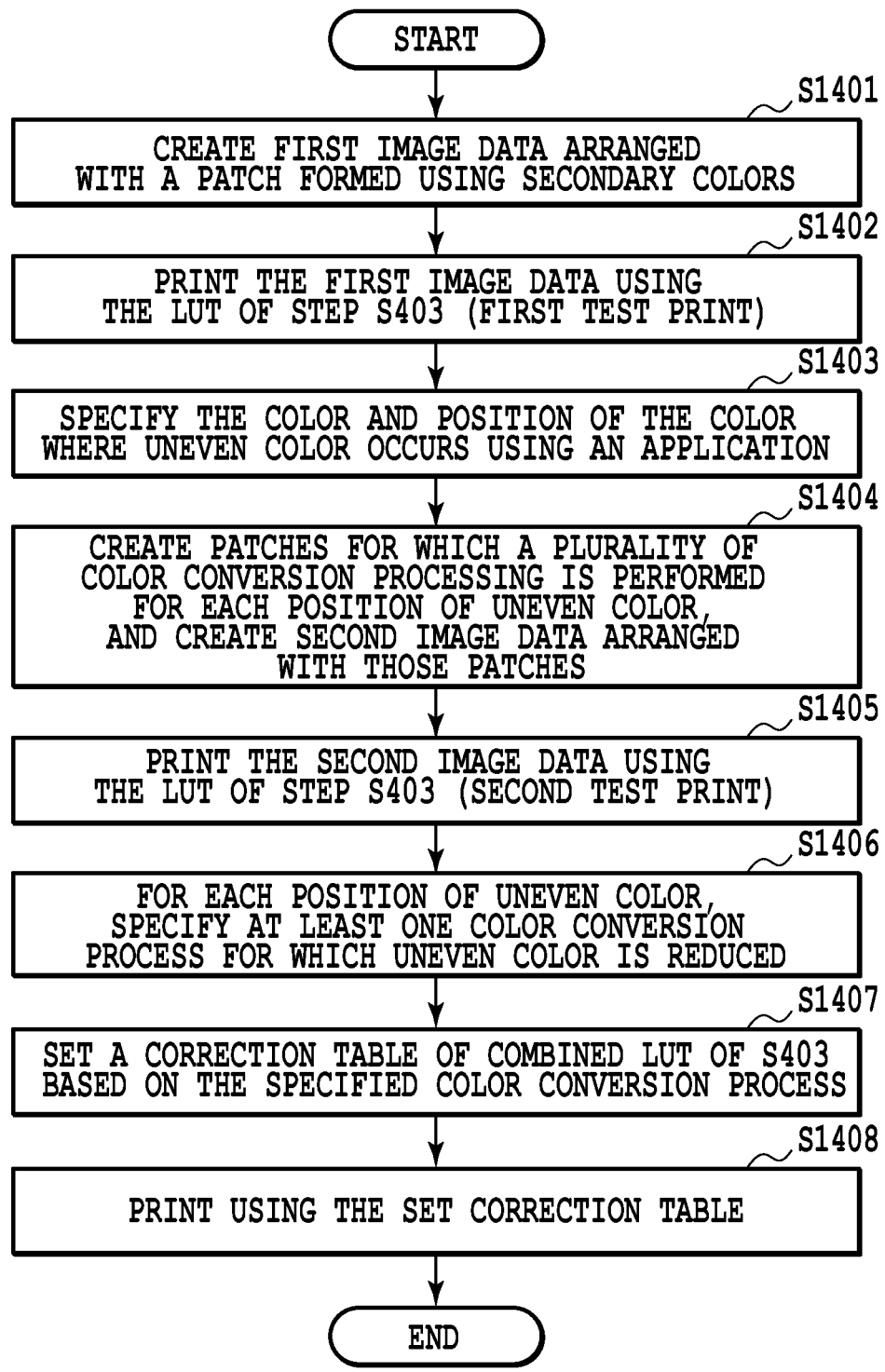
FIG. 14 is a flowchart illustrating both processing for generating parameters of a table used in the MCS processing section illustrated in FIG. 4B, and processing using the above table by the MCS processing section in the image processing upon generation of printing data.

FIG. 14 is a flowchart illustrating both processing for generating parameters of the table used in the input color conversion processing & MCS processing section 411, and MCS processing using the table in the image processing upon generation of printing data.

FIG. 14 illustrates the processing for generating the parameters of the three-dimensional LUT performed by the CPU 311. Different points from the flowchart in FIG. 5 are the processing at Steps S1402, S1405, and S1407.

At Step S1402, the LUT used for the input color conversion processing and the LUT used in the MCS processing section 411 are integrated. Thus, in the same manner as in the first embodiment, printing on the printing paper is performed as a test color image in the output unit 409 through the ink color conversion processing section 405, HS processing section 406, TRC processing section 407, and quantization processing section 408.

At Steps S1405 and S1407, the LUT used for the input color conversion processing and the LUT used in the MCS processing section 411 are also integrated in the same manner.

According to the first variation described above, the integrated LUT is used in the input color conversion processing & MCS processing section 411 to perform the same processing as in the first embodiment, and therefore in the same manner as in the first embodiment, color unevenness can be reduced. Also, the conversions are collectively performed with use of the one LUT, and therefore as compared with the first embodiment, a region prepared for the LUT can be reduced, and a processing speed can be improved.

(Second Variation)

FIG. 4C is a block diagram illustrating a configuration of an image processing unit according to a second variation of the present embodiment.

Generation of table parameters in an MCS processing section and processing in an MCS processing section in the present variation are the same as those illustrated in FIG. 5, and a different point is that the processing in the MCS processing section 404 is performed before the processing in the input color conversion processing section 403. Based on this, an independent characteristic of the module is improved. For example, the MCS processing section can be provided as an extended function for an image processing section not equipped with the MCS processing section. Also, the processing can be transferred to the host PC side.

(Third Variation)

FIG. 4D is a block diagram illustrating a configuration of an image processing unit according to a third variation. As illustrated in the diagram, the present variation has a configuration in which the HS processing section 406 provided in FIGS. 4A to 4C is omitted.

Generation of table parameters in an MCS processing section and processing in an MCS processing section in the present variation are the same as those illustrated in FIG. 5, and a different point is that the head shading in the HS processing section is not performed. That is, in the present variation, the table parameters in the MCS processing section are not ones that are generated on the basis of the data after the HS processing as in the above-described embodiment or variation. In the present variation, according to the flowchart illustrated in FIG. 5, the parameters of the table in the MCS processing section can be generated and image processing can be performed.

Figure 15A:
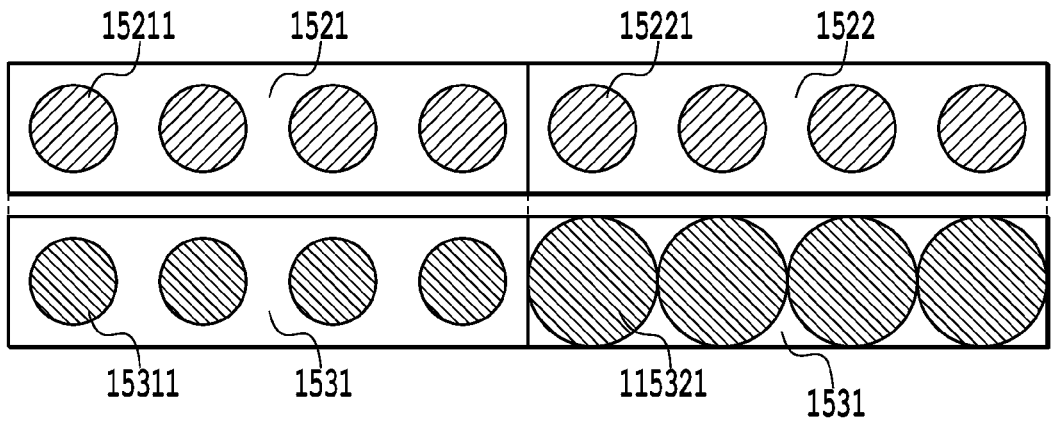
FIGS. 15A and 15B are diagrams for describing an example of images after the processing by the MCS processing section illustrated in FIG. 4D.
Figure 15B:
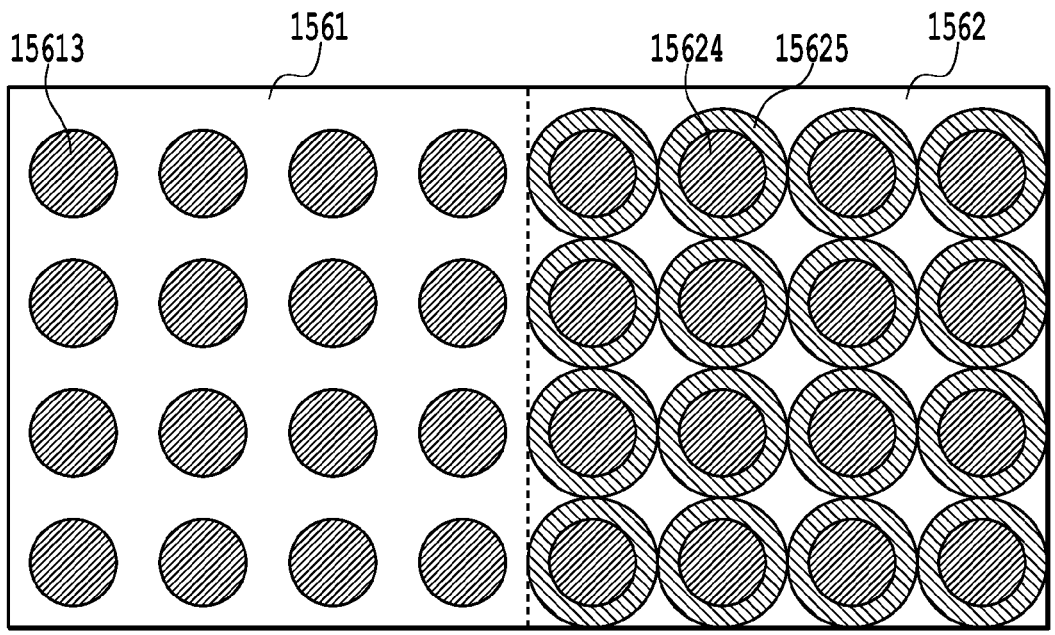

FIGS. 15A and 15B are diagrams for describing printing states of test color images in the present variation. FIG. 15B illustrates an example where the four nozzles corresponding to the second area among the nozzles of the magenta printing head 103 respectively have the larger ejection amounts than the standard, which is the same as the example illustrated in FIG. 3A. In the present variation, the HS processing is not applied to the image data (K, C, M, Y)=(0, 255, 255, 0) exhibiting blue, and therefore blue test color images as illustrated in FIG. 15B are printed. That is, even in the second area including the nozzles having the larger ejection amounts than the standard, the same numbers of magenta dots and cyan dots are printed. As a result, in the second area, a color shift from magenta occurs.

As a result of performing colorimetry of such patches, regarding the table parameters in the MCS processing section 404 of the present variation, correction values for reducing the magenta color are generated. By making such a correction, even in the present variation not including the HS processing section, upon printing of the blue data, the printing state as illustrated in FIG. 11B can be obtained, and the color shift can be reduced.

Also, in the present variation not provided with the HS processing section, it is not necessary to prepare the table for HS processing, and also the processing for HS processing, such as "pattern printing", "colorimetry", or "correction parameter calculation" is not required. As a result, a memory capacity can be reduced, and a time cost required for the HS processing can be reduced.

So far, the first embodiment and the first to third variations thereof have been described; however, processing content of each of them is only an example, and any configuration can be employed if the configuration can achieve the reduction in color unevenness, which is the effect of the present invention. For example, if relative color unevenness between areas can be reduced, the color unevenness that is the problem to be settled by the present invention does not stand out, and therefore a correction that brings all pieces of color unevenness close to a surrounding region not having color unevenness is not necessarily made. For example, the correction may be made to bring an entire region within a patch close to an arbitrary target color.

Also, in the above embodiment, a region defined by four nozzles is set as one area, which is set as a minimum unit for performing the MCS processing; however, it should be appreciated that the present invention is not limited to such a unit. A region defined by more nozzles may be set as the one unit, or the MCS correction may be made on a one nozzle basis. Further, the numbers of nozzles included in respective areas are not necessarily the same number, and the numbers of nozzles included in the respective areas may be appropriately set depending on device characteristics.

Further, the above embodiment is described by taking the example where the MCS processing is performed on the image data that is input in the RGB format, and then the conversion to the image data in the CMYK format corresponding to the ink colors used in the printer is performed; however, it should be appreciated that the present invention is not limited to such formats. The image data to be subjected to the MCS processing may have any format such as L*a*b*, Luv, LCbCr, or LCH, besides the RGB format.

(Second Embodiment)

Figure 17:
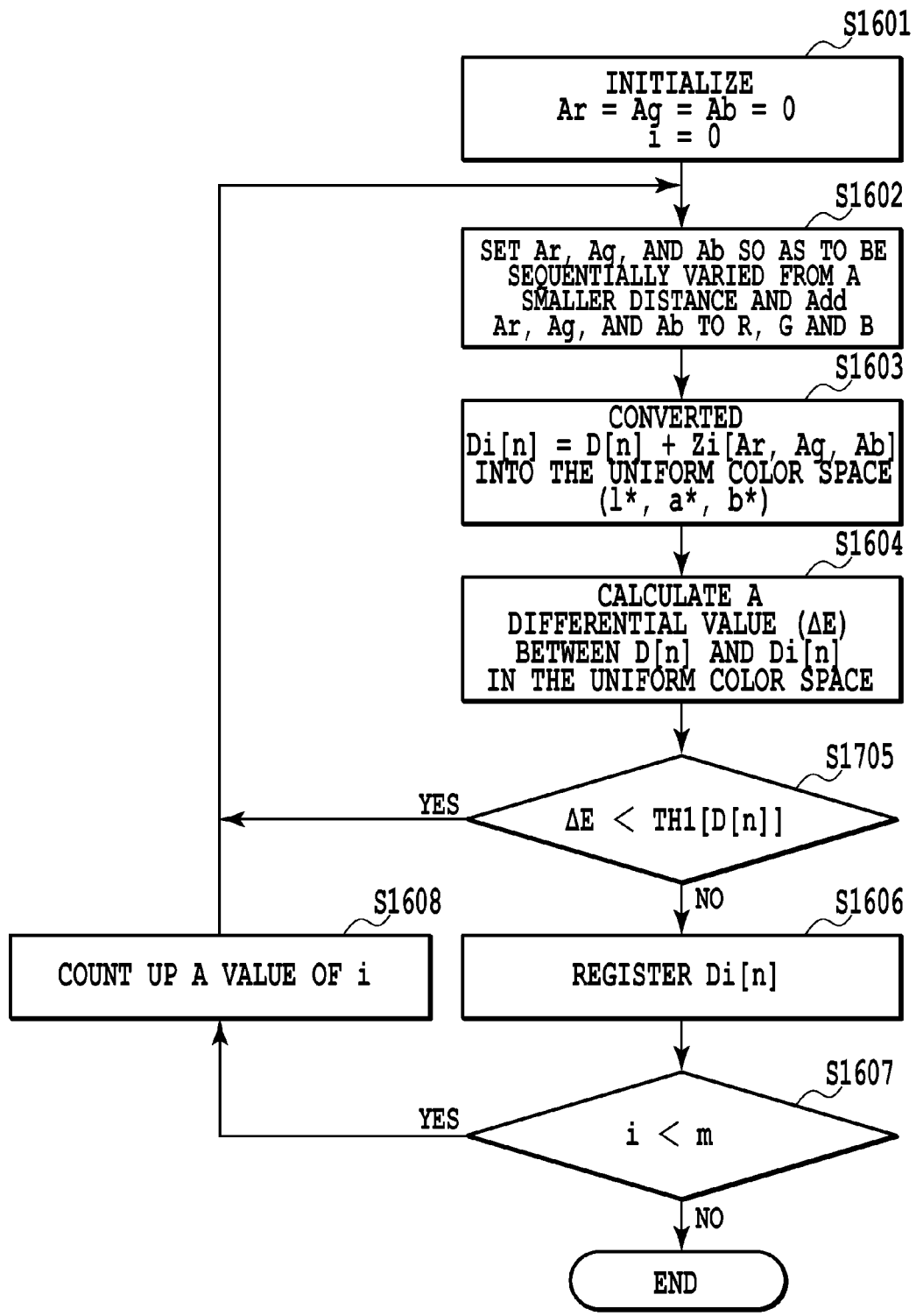
FIG. 17 is a flowchart illustrating a procedure for generating correction candidates in a second embodiment of the present invention.

FIG. 17 is a flowchart illustrating a procedure of determination processing for a plurality of correction candidate values according to a second embodiment, and illustrates the processing similar to that for determining the correction candidate values illustrated in FIG. 16 according to the first embodiment.

A different point in the present embodiment from the processing illustrated in FIG. 16 is that a threshold value used for determination at Step S1705 is varied depending on a color in which color unevenness occurs. That is, a CIELab color space used in the present processing is a uniform color space; however, from the perspective of visual characteristics, there is an imbalance in terms of color discrimination range. A deviation ellipse of MacAdam and a color-difference formula of dickers on this point are known in, for example, "The Color Science Association of Japan, "Color science handbook, new edition," Second Edition, University of Tokyo Press".

As illustrated at Step S1705 of FIG. 17, a discrimination threshold value TH1 [D[n]] that enables uniform color to be perceived is set depending on a color D[n] in which color unevenness occurs. That is, at Step S1705, the calculated ΔE is not compared with the preset threshold value TH1, but is compared with the threshold value TH1 [D[n]] depending on the color D[n] to determine whether or not the color unevenness is within a range where the color unevenness is viewed as uniform color.

That is, in the present embodiment, the threshold value TH1 is varied depending on a color of a patch, and in the case where the patch color is in a region near achromatic color, the plurality of correction candidate values are generated so as to relatively decrease distances between the plurality of correction candidates values, whereas in the case where the patch color is in a high saturation portion region, the plurality of correction candidate values are generated so as to relatively increase the distances as compared with the region near the achromatic color.

According to the present embodiment, the threshold value can be experimentally set on a color basis, and therefore the threshold value in the region near the achromatic color that is visually sensitive to color differences can be finely set, whereas the threshold value in the high saturation portion region that is insensitive to color differences can be coarsely set. Note that the TH1 [D[n] is set as an LUT (lookup table) in advance. That is, in the region near the achromatic color, the plurality of correction candidate values are generated so as to relatively decrease the distances between the plurality of correction candidate values, whereas in the high saturation portion region, the plurality of correction candidate values are generated so as to relatively increase the distances as compared with the region near the achromatic color.

(Third Embodiment)

Figure 18:
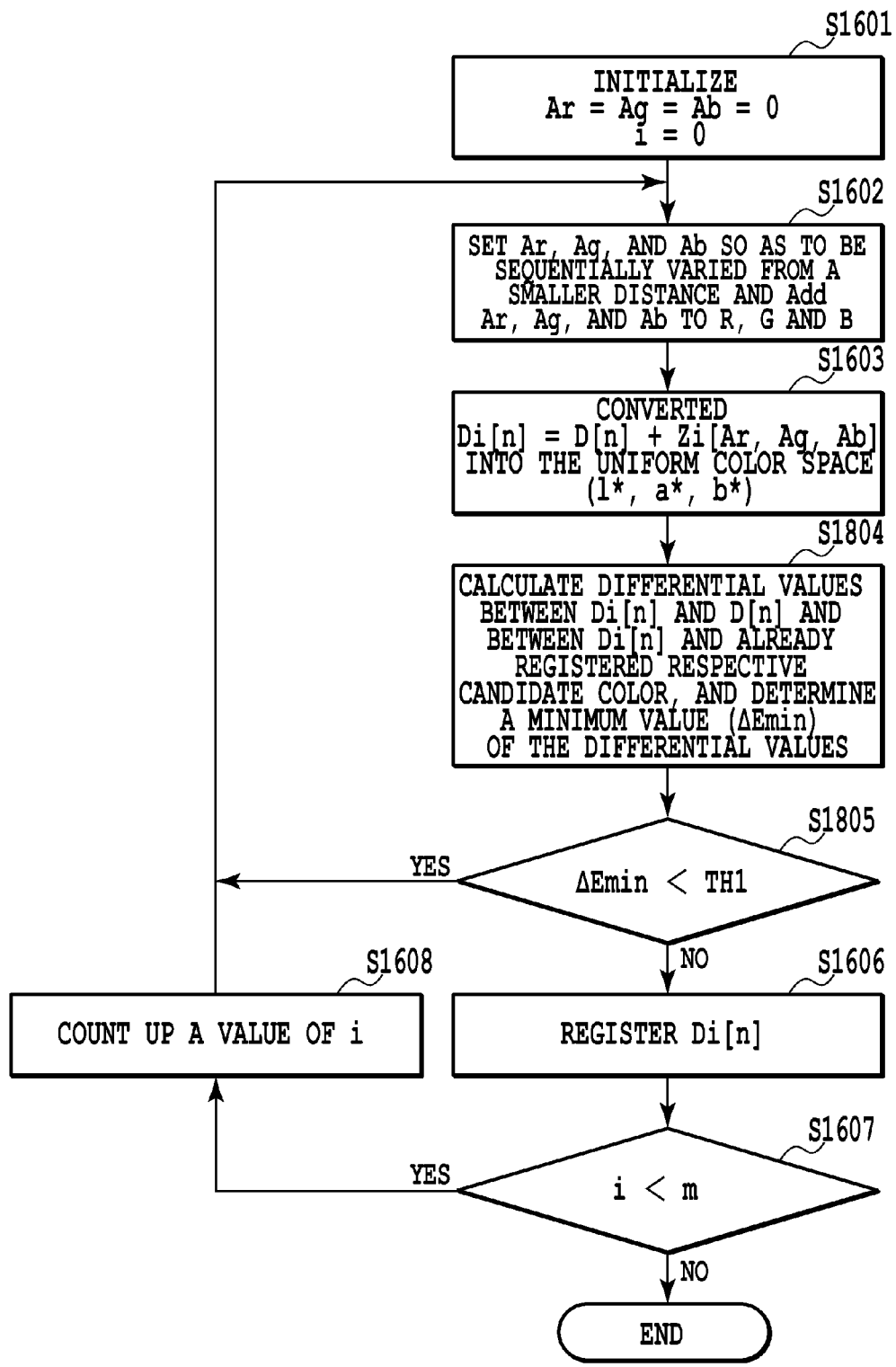
FIG. 18 is a flowchart illustrating a procedure for generating correction candidates in a third embodiment of the present invention.

FIG. 18 is a flowchart illustrating a procedure of determination processing for a plurality of correction candidate values according to a third embodiment, and illustrates the processing similar to that for determining the correction candidate values illustrated in FIG. 16 according to the first embodiment.

A different point in the present embodiment from the processing illustrated in FIG. 16 is processing that obtains color differences between candidate colors on the basis of the correction candidate values at Step S1804. In the embodiment illustrated in FIG. 16, a color D[n] to be corrected, and a color having a color difference that is based on the human visual characteristics and equal to or more than a predetermined threshold are set as the candidate colors. On the other hand, in the present embodiment, colors in which the color differences between the candidate colors are also equal to or more than a predetermined value are set as the candidate colors. That is, at Step S1804, a difference between Di[n] and D[n], i.e., differences between the correction candidate value Zi obtained at Step S1602 and a candidate color Di[n] obtained by making a correction with the correction candidate value Zi, and respective candidate colors that have already been registered are respectively calculated. Then, among the differences, a color difference having the smallest difference (color difference) (ΔEmin) is determined. Subsequently, at the next step S1805, ΔEmin is compared with TH1 to determine whether or not to be within uniform color. That is, in the present embodiment, Di[n] is generated such that the color difference between Di[n] and D[n] in the uniform color space exceeds the predetermined threshold value and color differences between a plurality of Di[n]s exceed the predetermined threshold value.

In the processing illustrated in FIG. 16, a candidate color that is different from a color in which color unevenness to be corrected occurs is set; however, if candidate colors are compared with each other, each of them may be a color within uniform color. That is, the similar colors are present as the candidate colors, and therefore a user may hesitate in selection. In the present embodiment, all of candidate colors are registered mutually with the predetermined color differences, and therefore the candidate colors can be more efficiently set.

(Fourth Embodiment)

Figure 19:
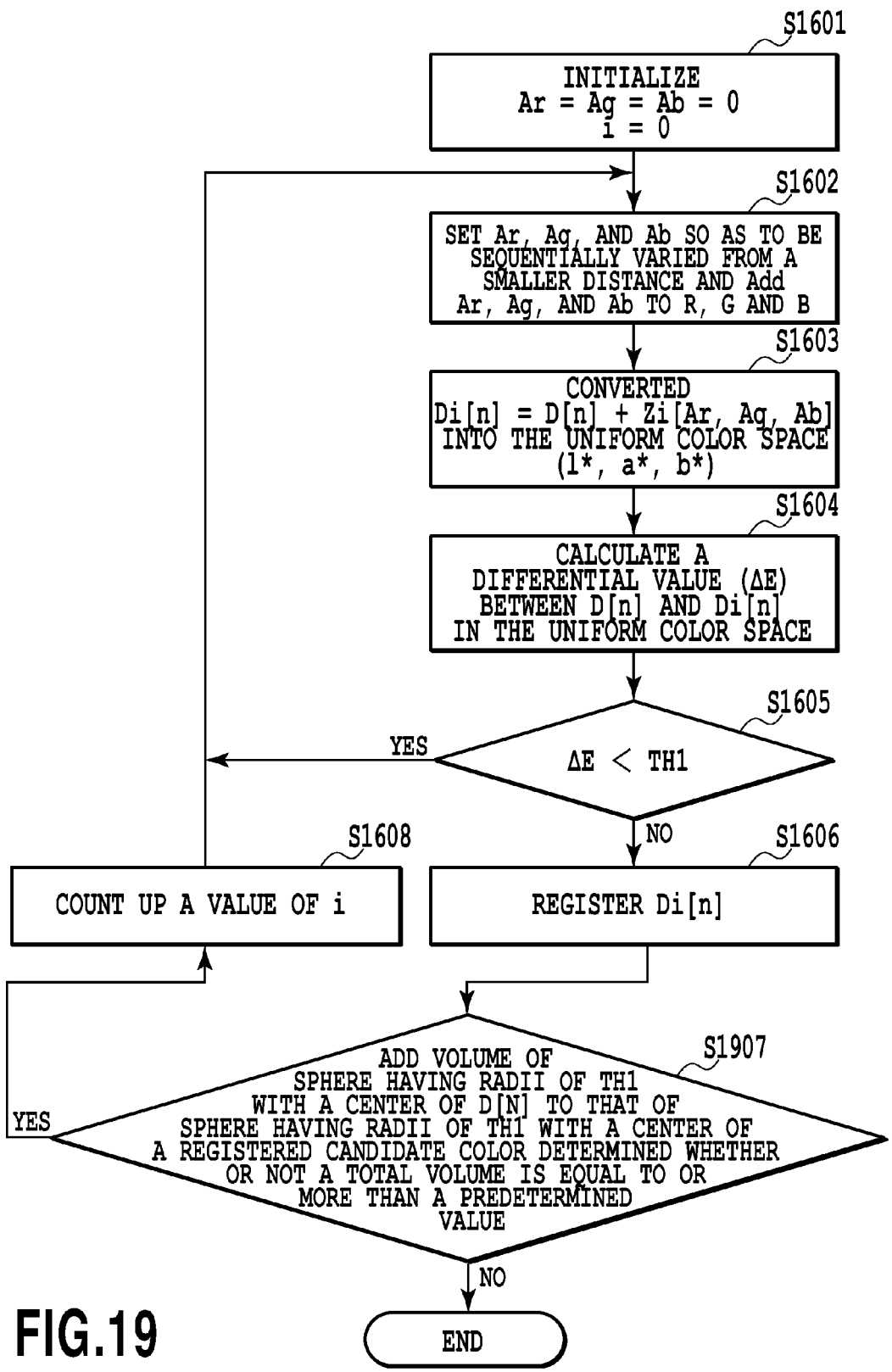
FIG. 19 is a flowchart illustrating a procedure for generating correction candidates in a fourth embodiment of the present invention.

FIG. 19 is a flowchart illustrating a procedure of determination processing for a plurality of correction candidate values according to a fourth embodiment, and illustrates the processing similar to that for determining the correction candidate values illustrated in FIG. 16 according to the first embodiment.

A different point in the present embodiment from the processing illustrated in FIG. 16 is processing at Step S1907. That is, in the processing illustrated in FIG. 16, when a predetermined number of candidate colors are registered, the processing is completed; however, in the present embodiment, a determination is made not by the number of candidate colors but by whether or not a range of preset candidate colors can be covered.

At Step S1907 of FIG. 19, volumes of spheres respectively having radii of TH1, which center a color D[n] in which color unevenness occurs and a registered candidate color Di[n], respectively, are calculated, and it is determined whether or not a total volume in which all of the volumes are added (however, overlap portions are eliminated) is equal to or more than a predetermined value. The total volume corresponds to a region of colors that are selectable from the candidate colors by a user. If the total volume occupies a certain volume or more, it is determined that a correction can be made, and the present processing is completed.

(Fifth Embodiment)

Figure 20:
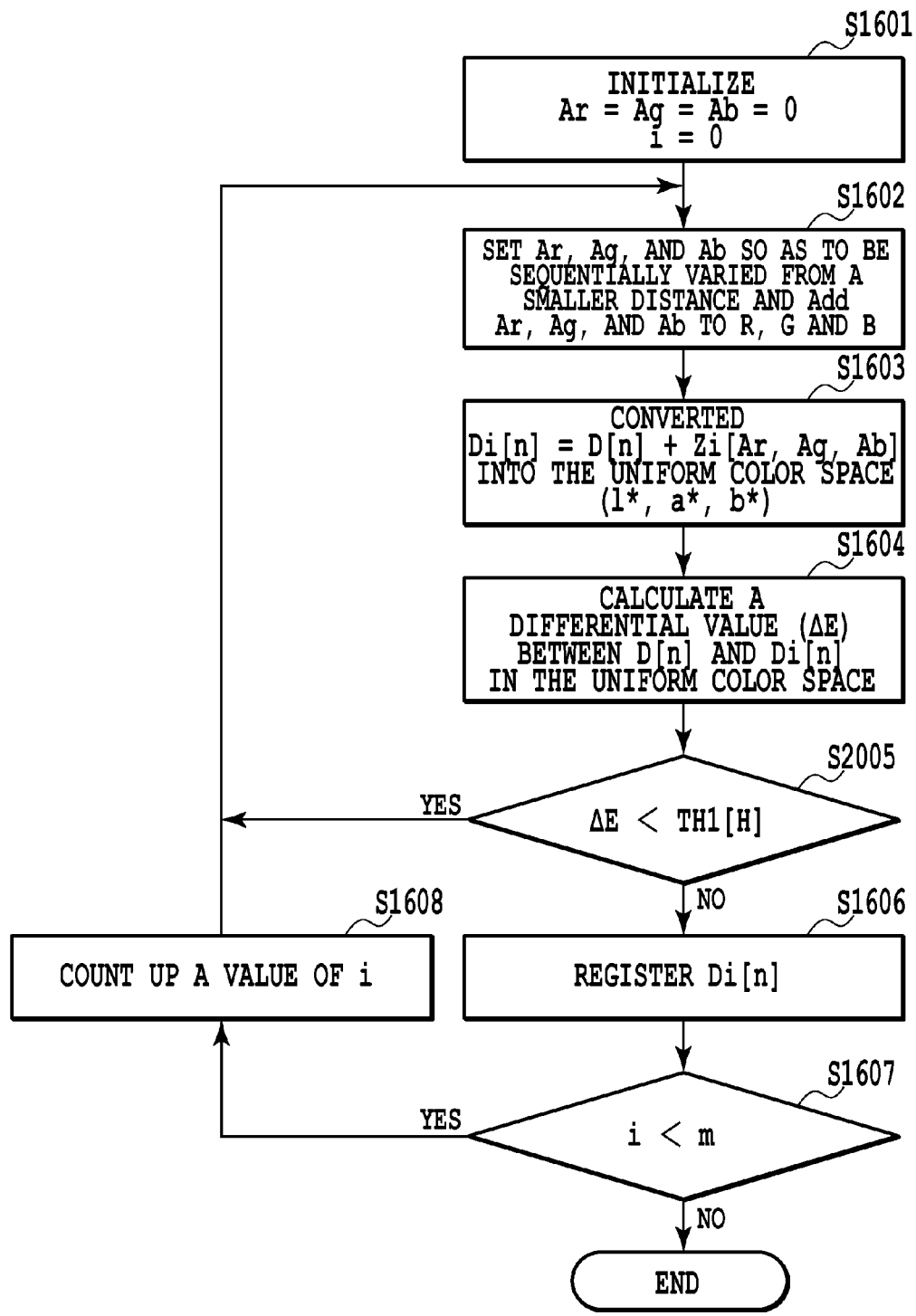
FIG. 20 is a flowchart illustrating a procedure for generating correction candidates in a fifth embodiment of the present invention.

FIG. 20 is a flowchart illustrating a procedure of determination processing for a plurality of correction candidate values according to a fourth embodiment, and illustrates the processing similar to that for determining the correction candidate values illustrated in FIG. 16 according to the first embodiment.

A different point in the present embodiment from the processing illustrated in FIG. 16 is processing at Step S2005. The present embodiment relates to an example where the strength of a degree of deviation of color unevenness that occurs in each of positions to be corrected can be specified.

At Step S2005 of FIG. 20, ΔE associated with a correction candidate value and a threshold are compared with each other; however, in the present embodiment, the threshold value TH1 [H] is varied depending on the strength (degree) of specified color unevenness. That is, it is not efficient to largely increase, on the basis of a visual discrimination threshold value, the number of candidate colors (candidate patches) of which ΔEs are equal to or less than a predetermined value. It is also not efficient to print a number of candidate colors corresponding to a "slight difference" around ΔE of 1.6 for, for example, color unevenness of which the strength is specified as "strong" in terms of the strength of color unevenness. Based on this point, by increasing TH1 [H] to approximately 3.0 for the color unevenness specified as "strong", first, candidate colors can be output at coarse intervals Also, a method in which a user registers a degree of deviation is also effective. That is, a degree of deviation is a sensory amount, and often different depending on a user. If a user who uses the image processing apparatus is constantly the same person, it is effective to customize and set a degree of deviation.

(Other Embodiments)

In the above-described embodiments and variations thereof, Ar, Ag, and Ab are added or subtracted in ascending order of absolute value to calculate ΔE; however, it should be appreciated that the present invention can also be applied to a method other than the method.

For example, it is also effective to employ a method that sets a predetermined distance from D[n] in the Lab space; converts values (assumed to be L1, a1, and b1) positioned at predetermined coordinates to values in the RGB space; and searches RGB values closest to the converted values. Based on this method, a way to determine the predetermined coordinates can be made to have a degree of freedom. That is, in the above-described embodiments, ΔE between a candidate color (patch color) and a color to be corrected is compared with a threshold value on the basis of the visual characteristics to thereby determine whether or not a setting as a candidate color is made. That is, the determination is made on the basis of whether or not a distance from the above color D[n] to be corrected is included in a certain sphere in a color space. On the other hand, in the present variation, the distance from D[n] can be freely set depending on D[n], and therefore a non-sphere can be employed.

That is, from the perspective of the human perception characteristics, a variation of L in the Lab space is sensitive as compared with a variation of a or b. That is, even in the case where ΔE is equal to or less than 1.6, if ΔL is equal to or more than 0.4, the variation may be visually perceived as color unevenness. In the present variation, the coordinates can be freely set, so that it is also possible to set an interval in an L-axis direction to be narrow, and intervals in a and b axes to be coarse as compared with that in an L-axis. That is, correction candidate values can be generated so as to, in a lightness direction corresponding to the L-axis direction, relatively decrease distances between a plurality of correction candidate values, and in hue/saturation directions defined by the a and b axes, as compared with in the lightness direction, relatively increase distances between the values.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-225746, filed Oct. 5, 2010, which is hereby incorporated by reference herein in its entirety.

What is claimed is:

1. An image processing apparatus that performs image processing for printing an image on a printing medium by using a printing head, the printing head including a first nozzle array having a plurality of nozzles for ejecting a first color ink, wherein the plurality of nozzles of the first nozzle array are arranged in a predetermined direction, and a second nozzle array having a plurality of nozzles for ejecting a second color ink, wherein the plurality of nozzles of the second nozzle array are arranged in the predetermined direction, the second color ink being different from the first color ink, wherein the first nozzle array and the second nozzle array are arranged in an intersecting direction which intersects with the predetermined direction, the image processing apparatus comprising:
- a first printing control unit configured to (i) print a first image on a first area in the printing medium by ejecting at least the first and second color ink from a first nozzle unit based on a predetermined color signal representing a predetermined color, wherein the first nozzle unit comprises a predetermined number of nozzles of the first nozzle array and a predetermined number of nozzles of the second nozzle array, and (ii) print a second image on a second area in the printing medium which is in a different position from the first area in the predetermined direction by ejecting at least the first and second color ink from a second nozzle unit based on the predetermined color signal, wherein the second nozzle unit comprises a predetermined number of nozzles of the first nozzle array and a predetermined number of nozzles of the second nozzle array, wherein the respective nozzles of the predetermined number of nozzles of the first and second nozzle arrays are different from the nozzles of the first nozzle unit, and wherein a position of nozzles of the second nozzle unit in the predetermined direction is different from a position of nozzles of the first nozzle unit in the predetermined direction;
- a first obtaining unit configured to obtain information showing whether or not a color correction to the first image is to be performed;
- a second obtaining unit configured to obtain a predetermined value of color difference which is used for performing color correction to the first image, wherein the predetermined value of color difference is determined by a user; and
- a second printing control unit configured to, in a case that the first obtaining unit obtains information showing the color correction to the first image is performed, print a plurality of color correction images which are used for specifying a first correcting color for correcting the predetermined color signal corresponding to the first nozzle unit,
- wherein each of the plurality of the color correction images is printed by ejecting ink from the first nozzle unit to a third area in the printing medium based on each of a plurality of correcting color signals representing each of a plurality of correcting colors obtained by the color correction to the predetermined color signal, and
- wherein a value of color difference between each of the plurality of correcting colors and the predetermined color corresponds to the predetermined value of color difference obtained by the second obtaining unit, and by ejecting ink from the second nozzle unit to a fourth area in the printing medium which is in a different position from the third area in the predetermined direction based on the predetermined color signal without the color correction.

2. The image processing apparatus according to claim 1, further comprising:
- a third obtaining unit configured to obtain information showing the first correcting color which is specified among the plurality of the correcting colors based on the plurality of the color correction image printed by the second printing control unit; and
- a third printing control unit configured to print the predetermined color image on the printing medium by ejecting ink from the first nozzle unit to a fifth area in the printing medium based on a first correcting color signal representing the first correcting color whose information is obtained by the third obtaining unit, and by ejecting ink from the second nozzle unit to a sixth area in the printing medium which is in a different position from the fifth area in the predetermined direction based on the predetermined color signal without the color correction.

3. The image processing apparatus according to claim 2, further comprising:
- a generating unit configured to generate the plurality of correcting color signals based on the predetermined color signal and the predetermined value of color difference obtained by the second obtaining unit.

4. The image processing apparatus according to claim 3, wherein the generating unit generates each of the plurality of correcting color signals by adding or subtracting each component of the predetermined color signal.

5. The image processing apparatus according to claim 4,
- wherein the generating unit generates each of the plurality of correcting color signals by adding or subtracting each component of the predetermined color signal one by one, and
- wherein the generating unit, in a case that a value of color difference between a color signal whose component is already added or subtracted and the predetermined color signal is lower than the predetermined value of color difference obtained by the second obtaining unit, further increases an added or subtracted amount to each component of the predetermined color signal.

6. The image processing apparatus according to claim 3, wherein the generating unit generates the plurality of correcting color signals so as to, in a lightness direction, relatively decrease distances between the plurality of correcting color signals, and in hue/saturation direction, as compared with the lightness direction, relatively increase the distances between the plurality of correcting color signals.

7. The image processing apparatus according to claim 3, wherein the generating unit generates the plurality of correcting color signals so as to, in a case that the predetermined color is included in a region near an achromatic color, decrease distances between the plurality of correcting color signals, as compared with in a case that the predetermined color is included in high saturation portion region.

8. The image processing apparatus according to claim 3, wherein the generating unit generates the plurality of correcting color signals such that each of values of color differences between the plurality of colors exceed a predetermined threshold value.

9. The image processing apparatus according to claim 2, wherein the predetermined value of color difference changes depending on a degree of color unevenness occurring to the predetermined color.

10. The image processing apparatus according to claim 2, wherein the predetermined value of color difference changes depending on the predetermined color.

11. The image processing apparatus according to claim 1, further comprising:
- an accepting unit configured to accept information showing the predetermined value of color difference determined by the user.

12. An image processing method that performs image processing for printing an image on a printing medium by using a printing head, the printing head including a first nozzle array having a plurality of nozzles for ejecting a first color ink, wherein the plurality of nozzles of the first nozzle array are arranged in a predetermined direction, and a second nozzle array having a plurality of nozzles for ejecting a second color ink, wherein the plurality of nozzles of the second nozzle array are arranged in the predetermined direction, the second color ink being different from the first color ink, wherein the first nozzle array and the second nozzle array are arranged in an intersecting direction which intersects with the predetermined direction, the image processing method comprising the steps of:

controlling to (i) print a first image on a first area in the printing medium by ejecting at least the first and second color ink from a first nozzle unit based on a predetermined color signal representing a predetermined color, wherein the first nozzle unit comprises predetermined number of nozzles of the first nozzle array and predetermined number of nozzles of the second nozzle array, and (ii) print a second image on a second area in the printing medium which is in a different position from the first area in the predetermined direction by ejecting at least the first and second color ink from a second nozzle unit based on the predetermined color signal, wherein the second nozzle unit comprises a predetermined number of nozzles of the first nozzle array and a predetermined number of nozzles of the second nozzle array, wherein the respective nozzles of the predetermined number of nozzles of the first and second nozzle arrays are different from the nozzles of the first nozzle unit, and wherein a position of nozzles of the second nozzle unit in the predetermined direction is different from a position of nozzles of the first nozzle unit in the predetermined direction;

obtaining information showing whether or not a color correction to the first image is to be performed;

obtaining a predetermined value of color difference which is used for performing color correction to the first image, wherein the predetermined value of color difference is determined by a user; and controlling to, in a case that information showing the color correction to the first image is performed is obtained, print a plurality of color correction images which are used for specifying a first correcting color for correcting the predetermined color signal corresponding to the first nozzle unit, wherein each of the plurality of the color correction image is printed by ejecting ink from the first nozzle unit to a third area in the printing medium based on each of a plurality of correcting color signals representing each of a plurality of correcting colors obtained by the color correction to the predetermined color signal, and wherein a value of color difference between each of the plurality of correcting colors and the predetermined color corresponds to the predetermined value of color difference obtained, and by ejecting ink from the second nozzle unit to a fourth area in the printing medium which is in a different position from the third area in the predetermined direction based on the predetermined color signal without the color correction.

13. The image processing method according to claim 12, further comprising the steps of:

obtaining an information showing the first correcting color which is specified among the plurality of the correcting colors based on the plurality of the color correction image printed; and controlling to print the predetermined color image on the printing medium by ejecting ink from the first nozzle unit to a fifth area in the printing medium based on a first correcting color signal representing the first correcting color whose information is obtained, and ejecting ink from the second nozzle unit to a sixth area in the printing medium which is different position from the fifth area in the predetermined direction based on the predetermined color signal without the color correction.

14. An image printing apparatus that prints an image on a printing medium by using a printing head, the printing head including a first nozzle array having a plurality of nozzles for ejecting a first color ink, wherein the plurality of nozzles of the first nozzle array are arranged in a predetermined direction, and a second nozzle array having a plurality of nozzles for ejecting a second color ink, wherein the plurality of nozzles of the second nozzle array are arranged in the predetermined direction, the second color ink being different from the first color ink, wherein the first nozzle array and the second nozzle array are arranged in an intersecting direction which intersects with the predetermined direction, the image printing apparatus comprising:

a first printing unit configured to (i) print a first image on a first area in the printing medium by ejecting at least the first and second color ink from a first nozzle unit based on a predetermined color signal representing a predetermined color, wherein the first nozzle unit comprises predetermined number of nozzles of the first nozzle array and predetermined number of nozzles of the second nozzle array, and (ii) print a second image on a second area in the printing medium which is in a different position from the first area in the predetermined direction by ejecting at least the first and second color ink from a second nozzle unit based on the predetermined color signal, wherein the second nozzle unit comprises a predetermined number of nozzles of the first nozzle array and a predetermined number of nozzles of the second nozzle array, wherein the respective nozzles of the predetermined number of nozzles of the first and second nozzle arrays are different from the nozzles of the first nozzle unit, and wherein a position of nozzles of the second nozzle unit in the predetermined direction is different from a position of nozzles of the first nozzle unit in the predetermined direction;

a first obtaining unit configured to obtain information showing whether or not a color correction to the first image is to be performed;

a second obtaining unit configured to obtain a predetermined value of color difference which is used for performing color correction to the first image, wherein the predetermined value of color difference is determined by a user; and a second printing unit configured to, in a case that the first obtaining unit obtains information showing the color correction to the first image is performed, print a plurality of color correction images which are used for specifying a first correcting color for correcting the predetermined color signal corresponding to the first nozzle unit, wherein each of the plurality of the color correction images is printed by ejecting ink from the first nozzle unit to a third area in the printing medium based on each of a plurality of correcting color signals representing each of a plurality of correcting colors obtained by the color correction to the predetermined color signal, and wherein a value of color difference between each of the plurality of correcting colors and the predetermined color corresponds to the predetermined value of color difference obtained by the second obtaining unit, and by ejecting ink from the second nozzle unit to a fourth area in the printing medium which is a different position from a third area in the predetermined direction based on the predetermined color signal without the color correction.

15. The image printing apparatus according to claim 14, further comprising:

a third obtaining unit configured to obtain information showing the first correcting color which is specified among the plurality of the correcting colors based on the plurality of the color correction image printed by the second printing unit; and a third printing unit configured to print the predetermined color image on the printing medium by ejecting ink from the first nozzle unit to a fifth area in the printing medium based on a first correcting color signal representing the first correcting color whose information is obtained by the third obtaining unit, and by ejecting ink from the second nozzle unit to a sixth area in the printing medium which is in a different position from the fifth area in the predetermined direction based on the predetermined color signal without the color correction.

16. An image processing apparatus that performs image processing or printing an image on a printing medium by using a printing head, the printing head including a first nozzle array having a plurality of nozzles for ejecting a first color ink, which are arranged in a predetermined direction, and a second nozzle array having a plurality of nozzles for ejecting a second color ink, which are arranged in the predetermined direction, the second color being different from the first color, wherein the first nozzle array and the second nozzle array are arranged in a intersecting direction which intersects with the predetermined direction, the image processing apparatus comprising:

a first printing control unit constructed to (i) print a first image on a first area in a printing medium by ejecting at least the first and second color ink from a first nozzle unit based on a predetermined color signal representing a predetermined color, wherein the first nozzle unit comprises predetermined number of nozzles of the first nozzle array and predetermined number of nozzles of the second nozzle array, and (ii) print a second image on a second area in the printing medium which is different position from the first area in the predetermined direction by ejecting at least the first and second color ink from a second nozzle unit based on the predetermined color signal, wherein the second nozzle unit comprises predetermined number of nozzles of the first nozzle array and predetermined number of nozzles of the second nozzle array, the respective predetermined number of nozzles of the first and second nozzle arrays being different from the nozzles of the first nozzle unit, wherein a position of nozzles of the second nozzle unit in the predetermined direction is different from a position of nozzles of the first nozzle unit in the predetermined direction;

a first obtaining unit constructed to obtain an information showing whether or not a color correction to the first image is to be performed;

a second obtaining unit constructed to obtain a predetermined value of color difference which is used for performing color correction to the first image, wherein the predetermined value of color difference in an uniform color space is higher than 0.8, and a second printing control unit constructed to, in a case that the first obtaining unit obtains an information showing the color correction to the first image is performed, print a plurality of color correction image which is used for specifying a first correcting color for correcting the predetermined color signal corresponding to the first nozzle unit, wherein each of the plurality of the color correction image is printed by ejecting ink from the first nozzle unit to a third area in a printing medium based on each of a plurality of correcting color signals representing each of a plurality of correcting colors obtained by the color correction to the predetermined color signal, and wherein a value of color difference between each of the plurality of correcting colors and the predetermined color corresponds to the predetermined value of color difference obtained by the second obtaining unit, and by ejecting ink from the second nozzle unit to a fourth area in the printing medium which is different position from the third area in the predetermined direction based on the predetermined color signal without the color correction.

17. The image processing apparatus according to claim 16, further comprising:

a third obtaining unit constructed to obtain an information showing the first correcting color which is specified among the plurality of the correcting colors based on the plurality of the color correction image printed by the second printing control unit; and a third printing control unit constructed to print the predetermined color image on the printing medium by ejecting ink from the first nozzle unit to a fifth area in a print medium based on a first correcting color signal representing the first correcting color whose information is obtained by the third obtaining unit, and ejecting ink from the second nozzle unit to a sixth area in the printing medium which is different position from the fifth area in the predetermined direction based on the predetermined color signal without the color correction.

* * * * *